US012604388B2

(12) United States Patent
Thimsen et al.

(10) Patent No.: US 12,604,388 B2
(45) Date of Patent: Apr. 14, 2026

(54) SYSTEMS AND METHODS FOR NONEQUILIBRIUM PLASMAS

(71) Applicant: Washington University, St. Louis, MO (US)

(72) Inventors: Elijah Thimsen, St. Louis, MO (US); Colin Page, St. Louis, MO (US); Xinhua Liang, St. Louis, MO (US)

(73) Assignee: Washington University, St. Louis, MO (US)

( * ) Notice: Subject to any disclaimer, the term of this patent is extended or adjusted under 35 U.S.C. 154(b) by 160 days.

(21) Appl. No.: 18/508,653

(22) Filed: Nov. 14, 2023

(65) Prior Publication Data

US 2024/0179825 A1 May 30, 2024

Related U.S. Application Data

(60) Provisional application No. 63/588,342, filed on Oct. 6, 2023, provisional application No. 63/425,307, filed on Nov. 14, 2022, provisional application No. 63/425,039, filed on Nov. 14, 2022.

(51) Int. Cl.
*H05H 1/24* (2006.01)
*B01J 23/755* (2006.01)
*H05H 1/46* (2006.01)

(52) U.S. Cl.
CPC .......... *H05H 1/2443* (2021.05); *B01J 23/755* (2013.01); *H05H 1/466* (2021.05)

(58) Field of Classification Search
CPC .. H05H 1/2406; H05H 1/2431; H05H 1/2443; H05H 1/245; H05H 1/46; H05H 1/466; H05H 2245/32; C23C 14/50; C23C 16/4583
See application file for complete search history.

(56) References Cited

U.S. PATENT DOCUMENTS

2003/0068012 A1* 4/2003 Ahmad .................. H05G 2/003 378/119
2004/0012319 A1* 1/2004 Shun'ko ........... H01J 37/32091 313/361.1
2006/0261721 A1* 11/2006 Niimi ..................... H05G 2/009 313/326
2007/0056841 A1 3/2007 Agarwal et al.
2009/0010835 A1* 1/2009 Ifland ...................... C01B 13/11 73/31.03
2011/0298376 A1* 12/2011 Kanegae ................. H05H 1/30 315/111.51
2016/0199806 A1 7/2016 Iliyas et al.
2016/0243518 A1 8/2016 Spitzl
2021/0257191 A1* 8/2021 Kondo ................ H01L 21/3065

OTHER PUBLICATIONS

Nozaki et al., "Innovative Methane Conversion Technology Using Atmospheric Pressure Non-thermal Plasma", Journal of the Japan Petroleum Institute, 2011, vol. 54, No. 3, pp. 146-158.

* cited by examiner

*Primary Examiner* — Wei (Victor) Y Chan
(74) *Attorney, Agent, or Firm* — Armstrong Teasdale LLP

(57) ABSTRACT

Described herein are systems and methods for nonequilibrium plasmas. In particular, described herein are methods to achieve sustained operation of plasma reactors contained in electrically insulating tubes, high power radiofrequency plasma devices using capacitively coupled electrodes, and methods to produce a carbonaceous compound and hydrogen using a nonequilibrium plasma device.

14 Claims, 23 Drawing Sheets

SYSTEMS AND METHODS FOR NONEQUILIBRIUM PLASMAS

RELATED APPLICATIONS

This application claims priority to U.S. Provisional Application Ser. No. 63/425,039, filed on Nov. 14, 2022, U.S. Provisional Application Ser. No. 63/425,307, filed on Nov. 14, 2022, and U.S. Provisional Application Ser. No. 63/588,342, filed on Oct. 6, 2023, the contents of which are hereby incorporated by reference in their entirety.

STATEMENT REGARDING FEDERALLY SPONSORED RESEARCH OR DEVELOPMENT

This invention was made with government support under CBET1847469 awarded by the National Science Foundation, CBET2033714 awarded by the National Science Foundation, and DE-SC0020352 awarded by the Department of Energy. The government has certain rights in the invention.

BACKGROUND

The field of the disclosure relates generally to systems and methods for nonequilibrium plasmas. In particular, the field of the disclosure relates to methods to achieve sustained operation of plasma reactors contained in electrically insulating tubes, high power radiofrequency plasma devices using capacitively coupled electrodes, and methods to produce a carbonaceous compound and hydrogen using a nonequilibrium plasma device.

Nonequilibrium plasmas, which are highly reactive partially ionized gasses, are attractive for chemical processing driven by electricity. It is often desirable to isolate the metallic electrodes used to generate the plasma from the chemically reactive flow. This isolation prevents deterioration of the electrodes and contamination of the flow. The isolation of the electrodes from the flow can be accomplished by means of an electrically insulating dielectric tube including, but not limited to, glass, fused silica, or alumina tubes. The plasma is effectively contained within this dielectric tube in the vicinity of the electrodes that are used to generate the discharge. The electrodes are driven by a high-frequency, high-voltage signal that alternates periodically with a frequency in the radiofrequency or microwave range, from 0.1 to 10,000 MegaHertz (MHz). Since the electrical current alternates with this high frequency, it can easily pass through the walls of the dielectric tube and be coupled to the plasma.

Research in recent years has focused on reforming hydrocarbon gasses and vapors in plasmas for the purpose of synthesizing organic products as well as hydrogen gas without $CO_2$ emission. One example is the synthesis of acetylene ($C_2H_2$) from methane ($CH_4$), which comprises approximately 90% of natural gas by volume. The synthesis of acetylene from methane also generates hydrogen by the overall reaction: $CH_4 \rightarrow ½C_2H_2+3/2H_2$. This reaction is more energy efficient and has a higher yield when excess hydrogen is present. The $H_2$:$CH_4$ ratio in the feed is typically on the order of 1:1, but could be as high as 10:1.

The challenge is that even though more than 90% of the carbon in the methane can react to make the desired chemical product, for example, $C_2H_2$, some small amount always makes a solid carbon byproduct. Previously, it was not possible to completely suppress this solid carbon formation over long periods of reactor run time while simultaneously maintaining a high production rate, which is only possible when the $H_2$:$CH_4$ ratio in the feed is less than 10:1. When the plasma is contained within a dielectric tube, a portion of this solid carbon deposits on the reactor walls, effectively fouling the reactor. For long reactor run times, the minor solid carbon byproduct builds up on the walls of the dielectric tube in the gap, and eventually short-circuits the electrodes that are used to generate the plasma, causing the plasma to become weaker and eventually extinguish. Thus, there is a need for systems and methods to achieve sustained operation of plasmas contained in electrically insulating tubes.

In addition, acrylonitrile (AN, $C_2H_3CN$) is currently synthesized industrially by ammoxidation of propene via the following overall reaction $C_3H_6+NH_3+3/2O_2 \rightarrow AN+3H_2O$. Since ammonia is produced by the reaction of nitrogen gas with hydrogen gas via the Haber-Bosch process, the synthesis of AN by ammoxidation consumes hydrogen. Other existing methods involve the thermo-catalytic synthesis of AN from $C_2H_2$ and HCN, which is a highly exothermic reaction that proceeds readily in the presence of a catalyst that was ultimately abandoned in part because of the hazards of storing and handling large quantities of HCN, and in part because of the high cost of purchasing acetylene.

Both the synthesis of acetylene ($C_2H_2$) from $CH_4$; and the synthesis of HCN from $CH_4$+$N_2$; are endothermic reactions. In fact, these reactions are very endothermic, with $2CH_4 \rightarrow C_2H_2+3H_2$ and $CH_4+½N_2 \rightarrow HCN+3/2H_2$ having enthalpies of reaction 376.5 kJ $gmol^{-1}$ and 210.0 kJ $gmol^{-1}$ respectively. Since the reactions are so endothermic, they only occur at very high temperatures in systems governed by local equilibrium. For that reason, thermal plasmas, in which the entire gas stream is heated up to several thousands of deg C. by an electrical arc, have attracted attention for decades in this context, since they provide a much higher yield than processes based on partial oxidation. The acetylene synthesis reaction in thermal plasmas is relatively well developed, but the cost of the electricity input to the plasma is prohibitively high, accounting for approximately 50% of the cost per mass of the product. Similarly, the cyanide synthesis reaction in thermal plasmas is also accompanied by prohibitively expensive energy costs.

As endothermic products favored at high temperatures, both $C_2H_2$ and HCN are unstable at relatively low temperatures after the plasma zone, which makes the quenching process critical in thermal plasmas. In practice, quenching is often accomplished by injecting copious amounts of low-temperature fluid. This quenching process via fluid injection, necessary to control the recombination of the products from a thermal plasma, drastically lowers the temperature of the out-flow by design, which limits opportunities for heat recovery from the plasma effluent. It would therefore be advantageous if the entire gas could remain at a lower temperature during the synthesis reaction, and the process could be driven by an environment that is not governed by local equilibrium, such as a nonequilibrium plasma environment.

Similar considerations and advantages are found for other alkane hydrocarbons and alkene hydrocarbons useful as feed sources, such as ethane, ethylene, propane, propylene, butane, butene, pentane, etc. Accordingly, the present disclosure is broadly applicable to hydrocarbons.

Thus, there is a need for methods to produce a carbonaceous compound and hydrogen using a nonequilibrium plasma device.

BRIEF DESCRIPTION

In one aspect, provided herein is a method of operating a plasma reactor, comprising: (i) providing the plasma reactor, the plasma reactor comprising: at least one dielectric tube defining at least one lumen; at least one electrode positioned adjacent to the dielectric tube, the at least one electrode configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube; a hydrogen gas source operatively coupled to the at least one dielectric tube, the hydrogen gas source configured to introduce gaseous hydrogen at a predetermined constant rate to the at least one plasma region; and a carbon gas source operatively coupled to the at least one dielectric tube, the carbon gas source configured to introduce a carbon-containing gas to the at least one plasma region at a controllable flow rate ranging between essentially zero rate and a predetermined setpoint rate; and (ii) introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.

In another aspect, provided herein is a plasma reactor, comprising: at least one dielectric tube defining at least one lumen; at least one electrode positioned adjacent to the at least one dielectric tube, the at least one electrode configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube; a hydrogen gas source operatively coupled to the at least one dielectric tube, the hydrogen gas source configured to introduce gaseous hydrogen at a predetermined constant rate to the at least one plasma region; and a carbon gas source operatively coupled to the at least one dielectric tube, the carbon gas source configured to introduce a carbon-containing gas to the at least one plasma region in an alternating pattern of essentially zero flow rate for a plasma region cleaning interval and at a predetermined setpoint rate for a product synthesis interval, wherein a molar ratio of $H_2$:C of a gas mixture within the at least one plasma region is less than about 10:1 during the product synthesis interval.

In still another aspect, provided herein is a method of producing hydrogen ($H_2$) and a product compound by non-equilibrium plasma synthesis, the method comprising: (i) introducing methane ($CH_4$) and nitrogen ($N_2$) into a non-equilibrium plasma reactor at a $CH_4$:$N_2$ molar ratio of about 3:0.5, preferably 3:0.75, to produce a mixture of acetylene ($C_2H_2$), hydrogen cyanide (HCN) and hydrogen ($H_2$) at a $C_2H_2$:HCN:$H_2$ molar ratio of about 1:1:4.5; (ii) introducing the mixture of acetylene ($C_2H_2$), hydrogen cyanide (HCN), and hydrogen ($H_2$) into a thermocatalytic reactor configured to cause the mixture to react in the presence of a catalyst to produce a second mixture comprising hydrogen ($H_2$) and the product compound; (iii) introducing the second mixture into a separation device to separate the hydrogen ($H_2$) from the product compound; and (iv) introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.

In yet another aspect, provided herein is a plasma device comprising: a plasma discharge tube; at least one pair of electrodes disposed along the plasma discharge tube in series; and a plurality of fluid connectors connecting the electrode of each pair of electrodes together and connecting each pair of electrodes to at least one other pair of electrodes to provide a coolant flow path through all of the electrodes in series.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Corresponding reference characters indicate corresponding parts throughout the drawings.

Figure 1A:
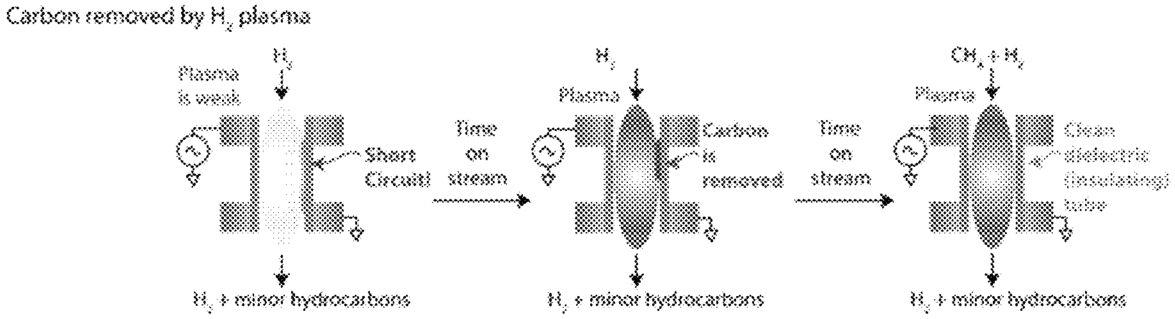
FIG. 1A depicts that carbon deposits on a wall can be removed by a hydrogen plasma in accordance with the present disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Methods to Achieve Sustained Operation of Plasmas Contained in Electrically Insulating Tubes.

Among the various aspects of the present disclosure is the provision for methods to achieve sustained operation of plasmas contained in electrically insulating tubes.

Briefly, therefore, the present disclosure is directed to methods to enable the sustained operation of plasmas contained in electrically insulating tubes.

In one aspect, a method of operating a plasma reactor is disclosed that includes providing the plasma reactor that includes at least one dielectric tube defining at least one lumen; at least one electrode positioned adjacent to the dielectric tube; a hydrogen gas source operatively coupled to the at least one dielectric tube, and a carbon gas source operatively coupled to the at least one dielectric tube. The at least one electrode is configured to produce a high voltage and high energy signal alternating at a frequency ranging from about 0.1 MHz to about 10,000 MHz, and the high voltage and high energy signal is delivered to at least one plasma region within at least one lumen of the at least one dielectric tube. The hydrogen gas source is configured to introduce gaseous hydrogen at a predetermined constant rate to the at least one plasma region. The carbon gas source is configured to introduce a carbon-containing gas to the at least one plasma region at a controllable flow rate ranging between essentially zero rate and a predetermined setpoint rate. The method further includes introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval. In some aspects, the carbon-containing gas comprises a hydrocarbon. In some aspects, the carbon-containing gas comprises $CH_4$.

In another aspect, a plasma reactor is disclosed that includes at least one dielectric tube defining at least one lumen; at least one electrode positioned adjacent to the at least one dielectric tube; a hydrogen gas source operatively coupled to the at least one dielectric tube; and a carbon gas source operatively coupled to the at least one dielectric tube. The at least one electrode is configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube. The hydrogen gas source is configured to introduce gaseous hydrogen at a predetermined constant rate to the at least one plasma region. The carbon gas source is configured to introduce a carbon-containing gas to the at least one plasma region in an alternating pattern of essentially zero flow rate for a plasma region cleaning interval and at a predetermined setpoint rate for a product synthesis interval, wherein a molar ratio of $H_2$:C of a gas mixture within the at least one plasma region is less than about 10:1 during the product synthesis interval. In some aspects, the at least one dielectric tube and at least one electrode comprise one dielectric tube passing through an electrode ring pair comprising a first electrode ring that is electrically grounded and a second electrode ring configured to produce the high voltage and high energy signal, wherein the electrode rings are coaxially aligned. In some aspects, the reactor further includes at least one additional electrode ring pair coaxially aligned with the electrode ring pair. In some aspects, the at least one dielectric tube and at least one electrode comprise a plurality of dielectric tubes passing through coaxially-aligned openings formed in a pair of perforated plate electrodes comprising a first perforated plate electrode that is electrically grounded and a second perforated plate electrode configured to produce the high voltage and high energy signal. In some aspects, the reactor further includes at least one additional pair of perforated plate electrodes coaxially aligned with the pair of perforated plate electrodes.

The present teachings include methods of sustained operation of plasmas contained in electrically insulating tubes. In some aspects, the electrically insulating tubes can be 1 or more insulating tubes. In some aspects, the insulating tubes include at least 1 electrode. In some aspects, the insulating tubes include a high-frequency signal device. In some aspects, the method includes modulating the flow of 2 gases inside the at least 1 insulating tubes. In some aspects, the method prevents short-circuiting of electrodes for plasmas contained within dielectric tubes. In another aspect, the plasmas can be used for the purpose of processing hydrocarbons. In yet another aspect, the method includes modulating the flow of 2 gases to have periods where the gas1:gas2 is very high (mostly gas1), and periods where the gas1:gas2 ratio is less than 10:1 (more hydrocarbon). In some embodiments, gas1 is $H_2$ and gas2 is $CH_4$. In some embodiments, gas 2 is a general hydrocarbon. In some aspects, the gas1:gas2 ratio is less than 10:1 during the synthesis portion of the cycle. In some embodiments, the dielectric tube can pass through a pair of electrode rings that are aligned coaxially. In some embodiments, the dielectric tube can pass through the center of many electrode pairs that are aligned coaxially and are alternately biased by the high-frequency voltage or grounded. In other embodiments, a pair of perforated plate electrodes have many dielectric tubes in parallel passing through them. In some embodiments, the plasma volume can be increased by having many pairs of perforated plates that are alternately biased by the high-frequency voltage or grounded. In some aspects, a high-frequency signal from the high-frequency signal device is coupled to a waveguide. In some embodiments, the waveguide has elements included for impedance matching. In some embodiments, the waveguide has a section of reduced height that excites the plasma contained within a dielectric tube that passes through the waveguide. In some aspects, the method includes reversible chemical reactions in nonequilibrium plasmas. In some aspects, the hydrocarbon feed gas can be suspended, $H_2$ plasma can continue to flow, and carbon buildup on the walls can react to make gaseous hydrocarbons that are removed from the flow system. In some embodiments, the method includes modulating the $CH_4$ flow to have time periods when the hydrocarbon product is synthesized, and time periods when the tube is cleaned. In some aspects, the method can prevent short-circuits and long-term reactor operation can be achieved.

The present disclosure is based, at least in part, on the discovery that chemical reactions in nonequilibrium plasmas are reversible. As shown herein, methods are described herein for the sustained operation of plasmas contained in electrically insulating tubes.

One aspect of the present disclosure provides for methods for the sustained operation of plasmas contained in electrically insulating tubes.

In some aspects, a method to prevent short-circuiting of electrodes for plasmas contained within dielectric tubes is disclosed, wherein the plasmas are used for the purpose of processing hydrocarbons. The method can involve modulating the flow to have periods where the $H_2$:$CH_4$ ratio is very high (mostly hydrogen), and periods where the $H_2$:$CH_4$ ratio is less than 10:1 (more hydrocarbon). In some aspects, $CH_4$ can be replaced by a more general hydrocarbon vapor/gas. In some embodiments, $CH_4$ can be used. In the case of a more general hydrocarbon, the $H_2$:C ratio should be less than 10:1 during the synthesis portion of the cycle.

In various aspects, the disclosed methods are suitable for use with a variety of electrode and tube configurations. Several non-limiting examples of electrode and tube configurations suitable for implementing the disclosed method of operation are provided in Appendix A. By way of non-limiting example, in one aspect the dielectric tube passes through a pair of electrode rings that are aligned coaxially. By way of another non-limiting example, in another aspect, the dielectric tube passes through the center of a plurality of electrode pairs that are aligned coaxially that are alternately biased by a high-frequency voltage or grounded. By way of an additional non-limiting example, a plurality of parallel dielectric tubes passes through openings within a pair of perforated plate electrodes. In some aspects, the plasma volume can be increased by having many pairs of perforated plates, which are alternately biased by the high-frequency voltage or grounded. In other additional aspects, a high-frequency signal is coupled to a waveguide, wherein the waveguide includes elements configured to provide impedance matching, as well as a section of reduced waveguide height configured to excite the plasma contained within a dielectric tube that passes through the waveguide.

The method disclosed herein is based on the discovery that chemical reactions in nonequilibrium plasmas are reversible. As a consequence, suspending the carbon feed to the reactor such that only an $H_2$ plasma is contained in the dielectric tube causes any carbon buildup on the walls of the dielectric tube to react with the $H_2$ plasma to produce gaseous hydrocarbons that are removed from the dielectric tube via the flow system. Therefore, modulating the $CH_4$ flow into a dielectric tube of a plasma reactor to provide time periods where the chemical product is synthesized ($CH_4$+$H_2$ in the feed), and time periods when the tube is cleaned ($H_2$ only in the feed), results in the prevention of short-circuits and the achievement of long-term reactor operation.

In various aspects, the disclosed method provides for the sustained operation of nonequilibrium plasma reactors for the reformation of hydrocarbons to produce valuable products and hydrogen gas. Without being limited to any particular theory, nonequilibrium reactors operated without the periodic modulation of carbon feed in accordance with the disclosed method can only be operated for a few 10s of minutes at sub-optimal conditions before succumbing to short circuits caused by carbon buildup in the reactor tubes. Operating the nonequilibrium plasma reactors according to the disclosed method provides for the indefinite operation of the reactors.

In various aspects, nonequilibrium plasma reactors operated using the method as disclosed herein may be used to synthesize hydrogen gas without $CO_2$ emission in an energy-efficient and cost-effective manner. In various other aspects, nonequilibrium plasma reactors operated using the method as disclosed herein may be used to synthesize valuable carbonaceous co-products from inexpensive fossil hydrocarbon resources.

EXEMPLARY EMBODIMENTS

1. A method of operating a plasma reactor, comprising:
   a. providing the plasma reactor, the plasma reactor comprising:
      i. at least one dielectric tube defining at least one lumen;
      ii. at least one electrode positioned adjacent to the dielectric tube, the at least one electrode configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube;
   iii. a hydrogen gas source operatively coupled to the at least one dielectric tube, the hydrogen gas source configured to introduce gaseous hydrogen at a predetermined constant rate to the at least one plasma region; and
   iv. a carbon gas source operatively coupled to the at least one dielectric tube, the carbon gas source configured to introduce a carbon-containing gas to the at least one plasma region at a controllable flow rate ranging between essentially zero rate and a predetermined setpoint rate;
  b. introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.
2. The method of embodiment 1, wherein the carbon-containing gas comprises a hydrocarbon.
3. The method of any one of the preceding embodiments, wherein the carbon-containing gas comprises $CH_4$.
4. The method of any one of the preceding embodiments, wherein the method synthesizes a nitrile compound and/or an aromatic compound.
5. The method of any one of the preceding embodiments, wherein the method synthesizes acrylonitrile.
6. A plasma reactor, comprising:
  a. at least one dielectric tube defining at least one lumen;
  b. at least one electrode positioned adjacent to the at least one dielectric tube, the at least one electrode configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube;
  c. a hydrogen gas source operatively coupled to the at least one dielectric tube, the hydrogen gas source configured to introduce gaseous hydrogen at a predetermined constant rate to the at least one plasma region; and
  d. a carbon gas source operatively coupled to the at least one dielectric tube, the carbon gas source configured to introduce a carbon-containing gas to the at least one plasma region in an alternating pattern of essentially zero flow rate for a plasma region cleaning interval and at a predetermined setpoint rate for a product synthesis interval, wherein a molar ratio of $H_2$:C of a gas mixture within the at least one plasma region is less than about 10:1 during the product synthesis interval.
7. The reactor of embodiment 6, wherein the at least one dielectric tube and the at least one electrode comprise one dielectric tube passing through an electrode ring pair comprising a first electrode ring that is electrically grounded and a second electrode ring configured to produce the high voltage and high energy signal, wherein the electrode rings are coaxially aligned.
8. The reactor of embodiment 7, further comprising at least one additional electrode ring pair coaxially aligned with the electrode ring pair.
9. The reactor of embodiment 6, wherein the at least one dielectric tube and at least one electrode comprise a plurality of dielectric tubes passing through coaxially-aligned openings formed in a pair of perforated plate electrodes comprising a first perforated plate electrode that is electrically grounded and a second perforated plate electrode configured to produce the high voltage and high energy signal.
10. The reactor of embodiment 7, further comprising at least one additional pair of perforated plate electrodes coaxially aligned with the pair of perforated plate electrodes.

Nonequilibrium Plasma Synthesis of Structural Carbon Materials from Methane for Hydrogen Production Among the various aspects of the present disclosure is the provision for methods to produce a carbonaceous compound and hydrogen using a nonequilibrium plasma device.

In one aspect, a method of producing hydrogen ($H_2$) and nitrile or aromatic compounds by nonequilibrium plasma synthesis is disclosed. Different nitrile compounds (e.g., acrylonitrile ($C_2H_3CN$)) or aromatic compounds (e.g., benzene, toluene, xylene) may be achieved by altering the catalyst and the ratio of $C_2H_2$:HCN produced by the plasma. The present disclosure exemplifies formation of acrylonitrile, but it is understood that all aspects of the present disclosure apply to other nitrile compounds and aromatic compounds.

The method includes introducing methane ($CH_4$) and nitrogen ($N_2$) into a nonequilibrium plasma reactor at a $CH_4$:$N_2$ molar ratio of about 3:0.5, preferably 3:0.75, to produce a mixture of acetylene ($C_2H_2$), hydrogen cyanide (HCN), and hydrogen ($H_2$) at a $C_2H_2$:HCN:$H_2$ molar ratio of about 1:1:4.5, introducing the mixture of acetylene ($C_2H_2$), hydrogen cyanide (HCN) and hydrogen ($H_2$) into a thermo-catalytic reactor configured to cause the mixture to react in the presence of a catalyst to produce a second mixture comprising hydrogen ($H_2$) and acrylonitrile ($C_2H_3CN$); and introducing the second mixture into a separation device to separate the hydrogen ($H_2$) from the acrylonitrile ($C_2H_3CN$). In some aspects, the nonequilibrium plasma reactor includes at least one dielectric tube defining at least one lumen and at least one electrode positioned adjacent to the dielectric tube, the at least one electrode configured to produce a high-voltage and high-energy signal alternating at a frequency ranging from about 0.1 MHz to about 10,000 MHz, wherein the high voltage and high energy signal is delivered to at least one plasma region within at least one lumen of the at least one dielectric tube. In some aspects, the nonequilibrium plasma reactor operates at a reaction pressure ranging from about 20 Torr to about 100 Torr. In some aspects, the catalyst comprises a Ni-based catalyst. In some aspects, the Ni-based catalyst comprises a supported nickel catalyst comprising $Ni/Al_2O_3$.

The present disclosure is based, at least in part, on the discovery that chemical reactions in nonequilibrium plasmas may be used to produce a carbonaceous product including, but not limited to, acrylonitrile and gaseous hydrogen in an energy-efficient manner.

For the production of acrylonitrile and gaseous hydrogen, the method includes introducing methane ($CH_4$) and nitrogen ($N_2$) into a nonequilibrium plasma reactor at a $CH_4$:$N_2$ molar ratio of about 3:0.5, preferably 3:0.75, to produce a mixture of acetylene ($C_2H_2$), hydrogen cyanide (HCN) and hydrogen ($H_2$) at a $C_2H_2$:HCN:$H_2$ molar ratio of about 1:1:4.5, introducing the mixture of acetylene ($C_2H_2$), hydrogen cyanide (HCN) and hydrogen ($H_2$) into a thermocatalytic reactor configured to cause the mixture to react in the presence of a catalyst to produce a second mixture comprising hydrogen ($H_2$) and acrylonitrile ($C_2H_3CN$); and introducing the second mixture into a separation device to separate the hydrogen ($H_2$) from the acrylonitrile ($C_2H_3CN$). In some aspects, the nonequilibrium plasma reactor includes at least one dielectric tube defining at least one lumen and at least one electrode positioned adjacent to the dielectric tube, the at least one electrode configured to produce a high-voltage and high-energy signal alternating at a frequency ranging from about 0.1 MHz to about 10,000 MHz, wherein the high voltage and high energy signal is delivered to at least one plasma region within at least one lumen of the at least one dielectric tube. In some aspects, the nonequilibrium plasma reactor operates at a reaction pressure ranging from about 20 Torr to about 100 Torr. In some aspects, the catalyst comprises a Ni-based catalyst. In some aspects, the Ni-based catalyst comprises a supported nickel catalyst comprising $Ni/Al_2O_3$.

In various aspects, other carbonaceous products may be produced using the method disclosed herein with modifications in the gas compositions introduced into the nonequilibrium plasma reactor.

In various aspects, the disclosed method may be implemented using any suitable nonequilibrium plasma reactor without limitation. In some aspects, the nonequilibrium plasma reactor includes at least one dielectric tube defining at least one lumen; at least one electrode positioned adjacent to the at least one dielectric tube; and a gas source operatively coupled to the at least one dielectric tube. The at least one electrode is configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube. The gas source is configured to introduce a gas mixture that includes at least one carbon compound to the at least one plasma region. In some aspects, the at least one dielectric tube and at least one electrode comprise one dielectric tube passing through an electrode ring pair comprising a first electrode ring that is electrically grounded and a second electrode ring configured to produce the high voltage and high energy signal, wherein the electrode rings are coaxially aligned. In some aspects, the reactor further includes at least one additional electrode ring pair coaxially aligned with the electrode ring pair. In some aspects, the at least one dielectric tube and at least one electrode comprise a plurality of dielectric tubes passing through coaxially-aligned openings formed in a pair of perforated plate electrodes comprising a first perforated plate electrode that is electrically grounded and a second perforated plate electrode configured to produce the high voltage and high energy signal. In some aspects, the reactor further includes at least one additional pair of perforated plate electrodes coaxially aligned with the pair of perforated plate electrodes.

By way of non-limiting example, in one aspect the dielectric tube passes through a pair of electrode rings that are aligned coaxially. By way of another non-limiting example, in another aspect, the dielectric tube passes through the center of a plurality of electrode pairs that are aligned coaxially that are alternately biased by a high-frequency voltage or grounded. By way of an additional non-limiting example, a plurality of parallel dielectric tubes passes through openings within a pair of perforated plate electrodes. In some aspects, the plasma volume can be increased by having many pairs of perforated plates, which are alternately biased by the high-frequency voltage or grounded. In other additional aspects, a high-frequency signal is coupled to a waveguide, wherein the waveguide includes elements configured to provide impedance matching, as well as a section of reduced waveguide height configured to excite the plasma contained within a dielectric tube that passes through the waveguide.

In various aspects, nonequilibrium plasma reactors operated using the method as disclosed herein may be used to synthesize hydrogen gas without $CO_2$ emission in an energy-efficient and cost-effective manner. In various other aspects, nonequilibrium plasma reactors operated using the method as disclosed herein may be used to synthesize valuable carbonaceous co-products from inexpensive fossil hydrocarbon resources.

EXEMPLARY EMBODIMENTS

1. A method of producing hydrogen ($H_2$) and a product compound by nonequilibrium plasma synthesis, the method comprising:
   a. introducing methane ($CH_4$) and nitrogen ($N_2$) into a nonequilibrium plasma reactor at a $CH_4$:$N_2$ molar ratio of about 3:0.5, preferably 3:0.75, to produce a mixture of acetylene ($C_2H_2$), hydrogen cyanide (HCN) and hydrogen ($H_2$) at a $C_2H_2$:HCN:$H_2$ molar ratio of about 1:1:4.5;
   b. introducing the mixture of acetylene ($C_2H_2$), hydrogen cyanide (HCN), and hydrogen ($H_2$) into a thermocatalytic reactor configured to cause the mixture to react in the presence of a catalyst to produce a second mixture comprising hydrogen ($H_2$) and the product compound;
   c. introducing the second mixture into a separation device to separate the hydrogen ($H_2$) from the product compound; and
   d. introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.
2. The method of embodiment 1, wherein the nonequilibrium plasma reactor comprises at least one dielectric tube defining at least one lumen and at least one electrode positioned adjacent to the dielectric tube, the at least one electrode configured to produce a high voltage and high energy signal alternating at a frequency ranging from about 0.1 MHz to about 10,000 MHz, wherein the high voltage and high energy signal is delivered to at least one plasma region within at least one lumen of the at least one dielectric tube.
3. The method of any one of the preceding embodiments, wherein the nonequilibrium plasma reactor operates at a reaction pressure ranging from about 20 Torr to about 100 Torr.
4. The method of any one of the preceding embodiments, wherein the nonequilibrium plasma reactor operates at a reaction pressure ranging from about 50 Torr to about 100 Torr.

5. The method of any one of the preceding embodiments, wherein the catalyst comprises a catalyst selected from the group consisting of Ni-based catalysts, Cd-based catalysts, Mg-based catalysts, Ca-based catalysts, and combinations thereof, wherein the catalyst is optionally supported by a supporter selected from the group consisting of $Al_2O_3$, $Al_2MgO_4$, and combinations thereof.
6. The method of any one of the preceding embodiments, wherein the catalyst comprises a Ni-based catalyst.
7. The method of any one of the preceding embodiments, wherein the Ni-based catalyst comprises a supported nickel catalyst comprising $Ni/Al_2O_3$.
8. The method of any one of the preceding embodiments, wherein the product compound is selected from the group consisting of nitrile compounds, acrylonitrile ($C_2H_3CN$), aromatic compounds, benzene, toluene, xylene, and combinations thereof.

Capacitively Coupled Electrode Arrangement for High Power Radiofrequency Plasma Applications.

One aspect of the present disclosure is a plasma device including a plasma discharge tube, a plurality of pairs of electrodes disposed along the plasma discharge tube in series, and a plurality of fluid connectors connecting the electrode of each pair of electrodes together and connecting each pair of electrodes to at least one other pair of electrodes to provide a coolant flow path through all of the electrodes in series.

Figure 10:
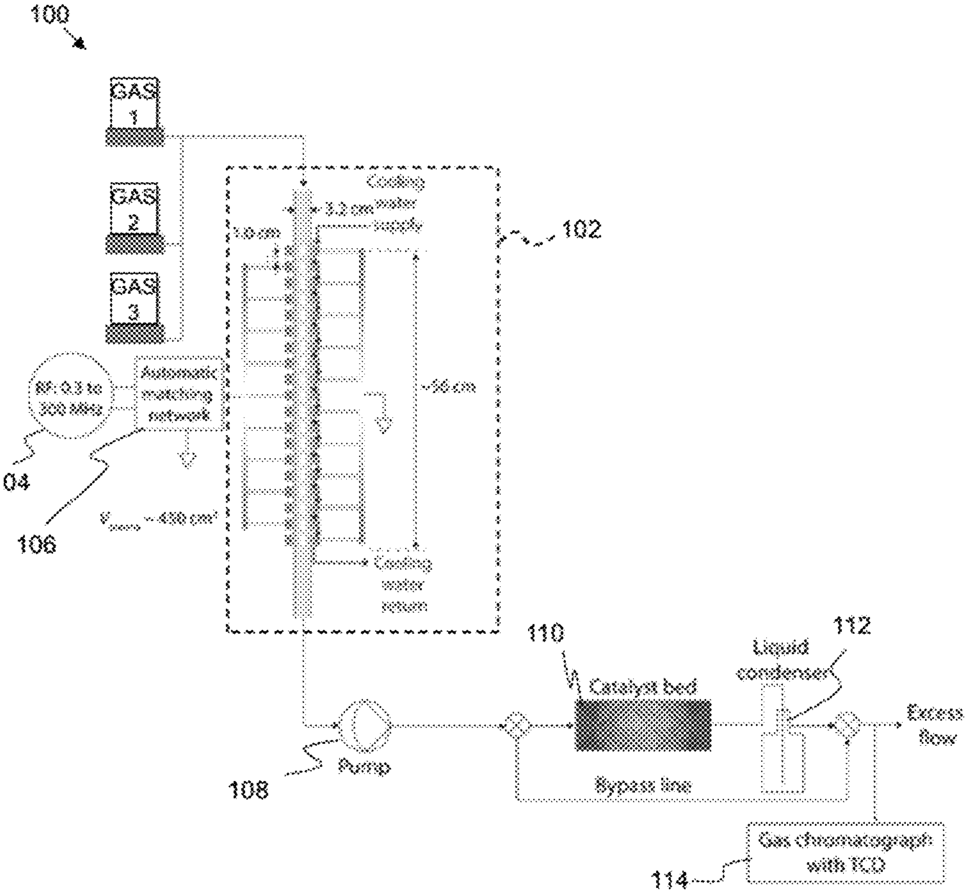
FIG. 10 depicts a simplified diagram of an example plasma system in accordance with the present disclosure.

FIG. 10 is a simplified diagram of an example plasma system 100 according to the present disclosure. The plasma system includes a plasma device 102, and RF source 104, a matching network 106, a pump 108, a catalyst bed 110, a liquid condenser 112, and a gas chromatograph (with thermal conductivity detector). In general, the plasma system 100 is used to produce liquid chemicals from one or more gas input to the plasma device 102. In the example embodiment, three gasses are shown being input to the plasma device, but more or fewer gasses may be input to the plasma device 102 depending on the desired resulting product. In one example, liquids such as acrylonitrile is produced from an input of methane, hydrogen, and nitrogen as gas 1, gas 2, and gas 3. Other embodiments include the production of semiconductor nanocrystals such as III-nitrides, structural ceramics particles such as metal-oxides, as well as production of energetic materials (explosives and propellants) such as aluminum nanoparticles or polynitrogen compounds such as pentazolate using appropriate input gasses. The RF source 104 provides an RF signal through the impedance matching network 106 to the plasma device to power the plasma device to generate plasma to affect the gas or gasses input to the plasma device 102 to produce the desired output. The pump 108 facilitates extraction from the plasma device of the resulting product(s) from exposing the gas or gasses to plasma. The resulting products are processed through the catalyst bed 110 and collected in the liquid condenser 112. A portion of the resulting products are diverted before the catalyst bed for analysis using the gas chromatograph.

Figure 11:
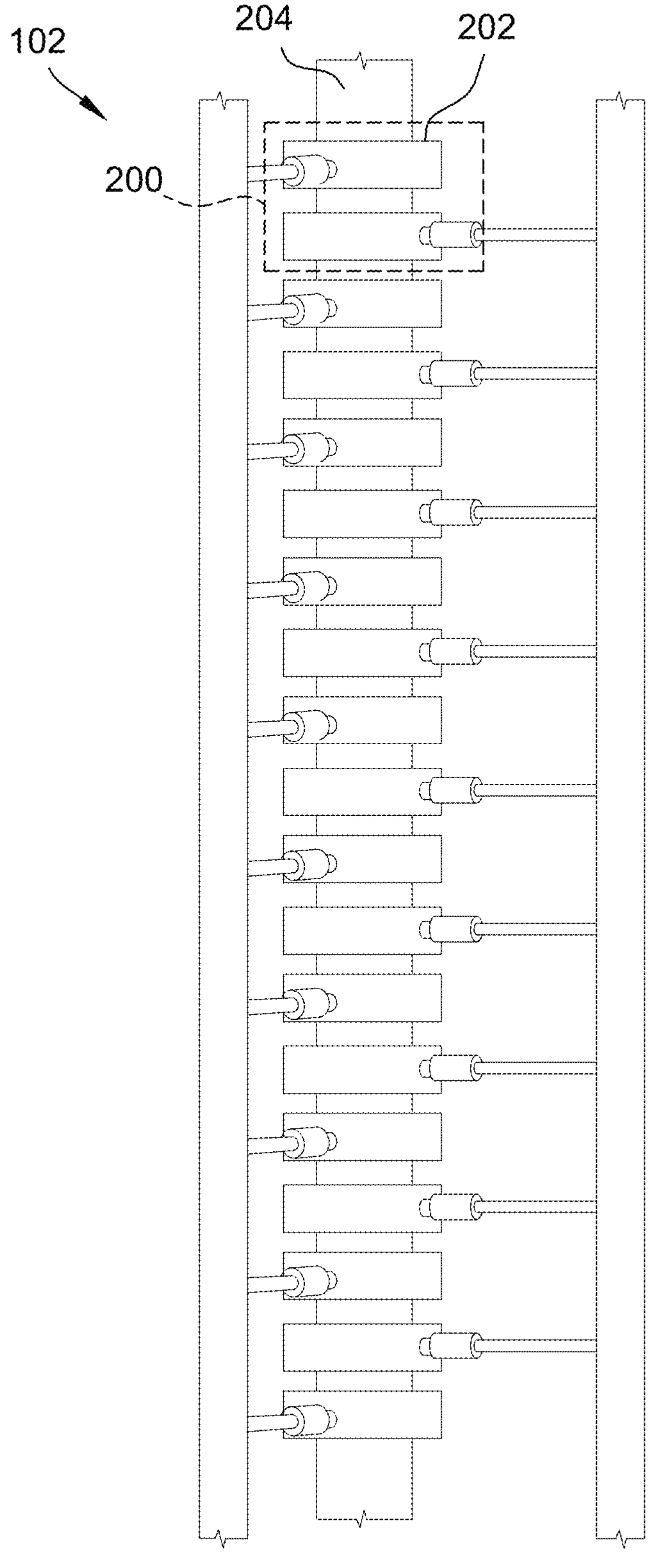
FIG. 11 depicts an example plasma device for use in the system shown in FIG. 10.

FIG. 11 is an example plasma device 102 for use in the plasma system 100 shown in FIG. 10. The example plasma device includes pairs 200 of electrodes 202, and a plasma discharge tube 204 passing through the center of the pairs 200 of electrode 202. The plasma discharge tube 204 is made of an electrically insulating, dielectric material, such as glass, fused silica, or alumina. Other embodiments may use a plasma discharge tube 204 made of any other suitable material. The application of the RF signal from the RF source 104 to each pair 200 of electrodes 202 produces plasma in the plasma discharge tube 204 through capacitive coupling. In the example embodiment, there are ten pairs 200 of electrode 202 for a total of twenty electrodes 202. In other embodiments, any other suitable number of pairs 200 of electrodes may be used to meet the requirements for producing the desired results at the desired rate. The pairs 200 of electrodes 202 are disposed in series along the length of the plasma discharge tube 204 to produce plasma along the length of portion of the tube 204 at which the pairs 200 of electrodes 202 are located. Thus, gasses passing through the plasma discharge tube 204 will pass by all pairs 200 of electrodes 202 one after the other (and through the plasma generated by all pairs).

Figure 12:
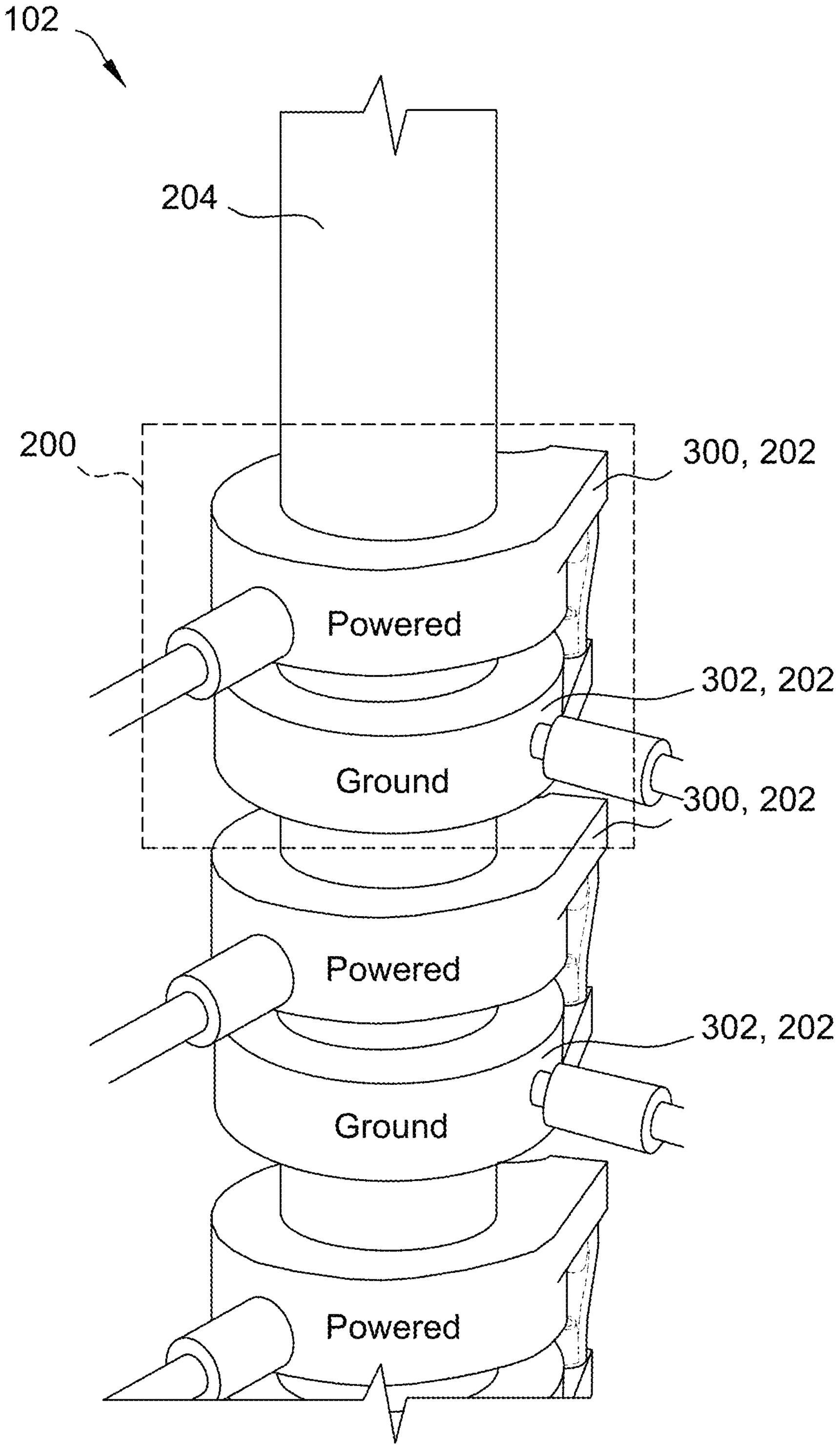
FIG. 12 depicts a close-up view of a portion of the plasma device shown in FIG. 11 showing two different types of electrode forming electrode pairs.

FIG. 12 is a close-up view of a portion of the plasma device 102 shown in FIG. 11. As can be seen in FIG. 12, the plasma device includes two different types of electrodes 202 in each pair 200 of electrodes 202. Specifically, each pair 200 includes a first type 300 of electrode 202 and a second type 302 of electrode 202. In the example embodiment, each first type 300 of electrode 202 is a powered electrode that is driven by the RF signal from the RF source 204. Each second type 302 of electrode 202 is an undriven, grounded electrode. In other embodiments, the first type 300 may be grounded and the second type 302 may be powered. In the example embodiment, both the first type 300 and the second type 302 are ring electrodes, but in other embodiments, the first type 300 or the second type 302 (or both) may be a plate electrode. In other embodiments, any other suitable configuration of electrode may be used for the first type 300 and the second type 302.

Figure 13:
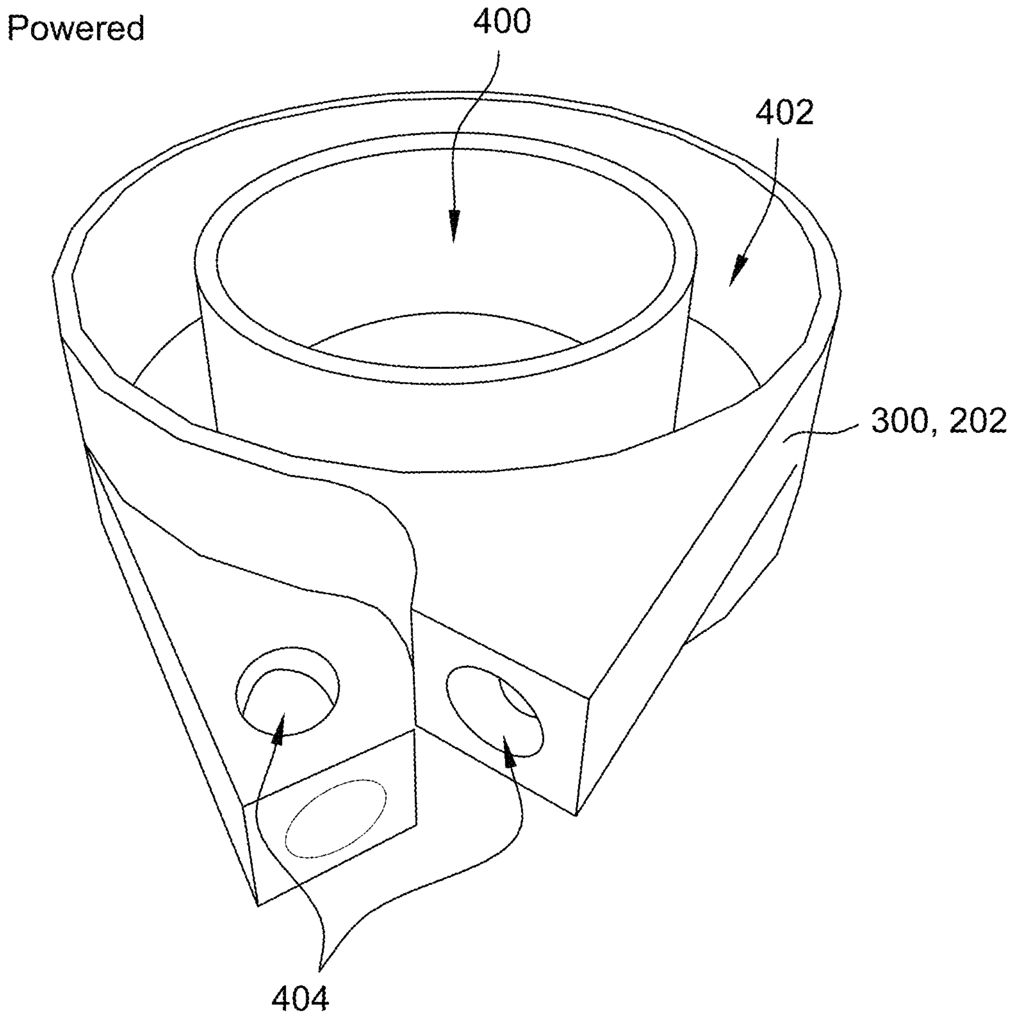
FIG. 13 depicts a cross section view of an example first type of electrode for use in the plasma device shown in FIG. 11.

FIG. 13 is a cross section view of an example of a ring electrode configuration of the first type 300 of electrode 202 for use in the plasma device 102 shown in FIG. 11. The first type 300 of electrode 202 includes a central aperture 400 through which the plasma discharge tube passes. A fluid passage 402 is disposed between the central aperture and an outer wall of the first type 300 of electrode 202. Coolant apertures 404 are in fluid communication with the fluid passage 402 to allow coolant to flow through one coolant aperture 404 into the electrode 202, through the fluid passage 402, and out another of the coolant aperture 404.

Figure 14:
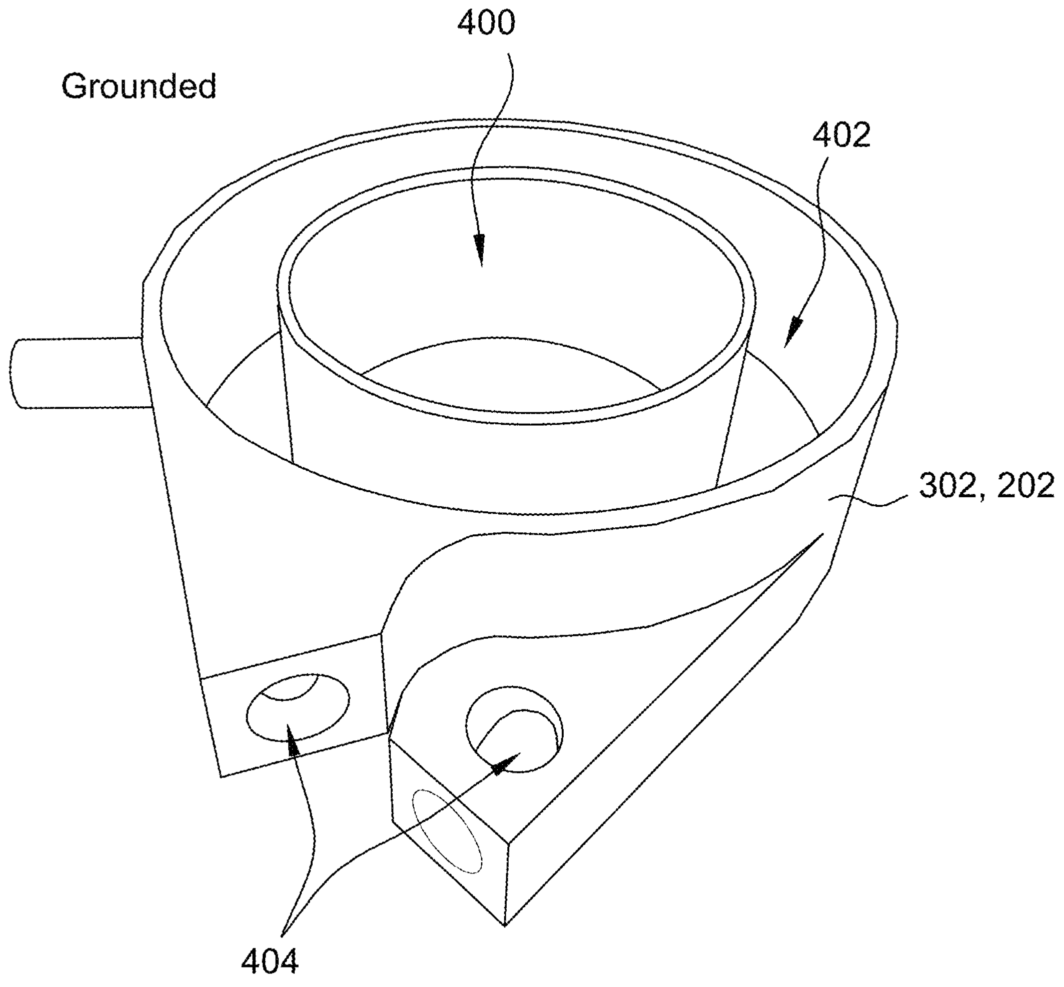
FIG. 14 depicts a cross section view of an example second type of electrode for use in the plasma device shown in FIG. 11.

FIG. 14 is a cross section view of an example second type 302 of 202 for use in the plasma device 102 shown in FIG. 11. The second type 302 of electrode 202 also includes the central aperture 400 through which the plasma discharge tube passes, the fluid passage 402, and coolant apertures 404 in fluid communication with the fluid passage 402.

Figure 15:
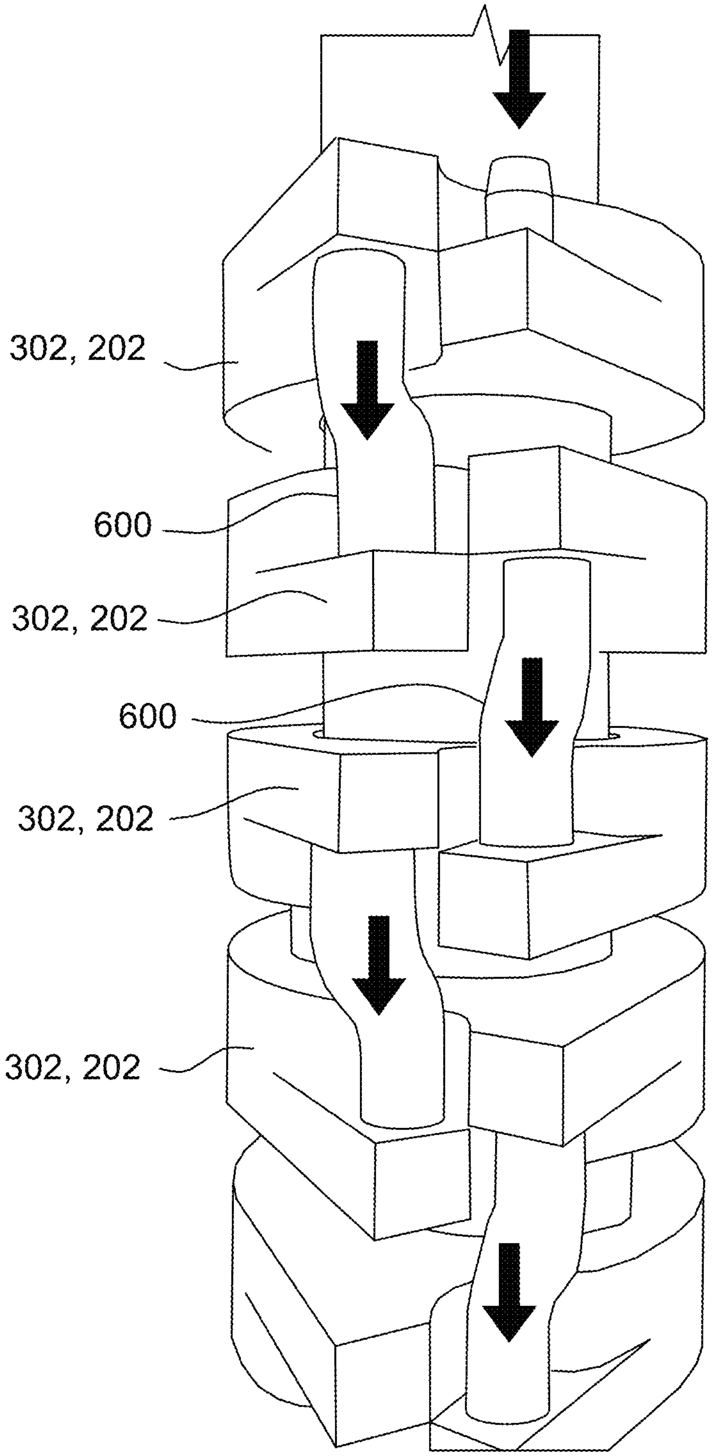
FIG. 15 depicts a close-up view of a portion of the plasma device shown in FIG. 11 showing a cooling flow through the electrodes.

FIG. 15 is a close-up view of a portion of the plasma device 102 shown in FIG. 11 showing a cooling flow through the electrodes 202. As can be seen in FIG. 15, the location and orientation of the coolant apertures 404 in the first type 300 and the second type 302 are designed to facilitate the flow of coolant into and through the first type 300 of electrode, out of the first type 300 of electrode 202, into and through the second type 302 of electrode, and out of the second type 302 of electrode to the next first type 300 of electrode. Fluid connectors 600 connect the coolant apertures 404 of the first type 300 of electrode to the coolant apertures of the second type 302 of electrode 202 in each pair 200 of electrodes 200. The fluid connectors also connect the outlet coolant apertures 404 of the second type 302 of electrode 202 to the inlet coolant apertures 404 of the first type 300 of electrode in the next pair 200 of electrodes 202.

The example plasma system 100 may be used with power in the range from 10 to 10,000 W at frequencies in the range from 0.1 to 10,000 MHz. At high power levels (e.g., above a few 100 Watts) in a plasma device, it is generally necessary to cool electrodes to prevent them from becoming too hot, which can result in system failure. In the example plasma device 102, cooling of the electrodes is accomplished by means of the coolant flow described and shown above. The ground and powered electrodes are chiral, with complimentary geometries such that coolant can be sent from one electrode to the next by affixing fluid connectors (e.g., a tube) to an appropriate connection, for example a hose barb, extending from the coolant apertures 404. This facilitates placement of the electrodes 202 close to one another (e.g., within a few cm), while also allowing unobstructed coolant flow. Thus, the electrodes can produce a high electrical field (close spacing) with unobstructed coolant flow in a compact form factor.

Exemplary Embodiments

1. A plasma device comprising:
   a plasma discharge tube;
   at least one pair of electrodes disposed along the plasma discharge tube in series; and
   a plurality of fluid connectors connecting the electrode of each pair of electrodes together and connecting each pair of electrodes to at least one other pair of electrodes to provide a coolant flow path through all of the electrodes in series.
2. The plasma device of embodiment 1, wherein the at least one pair of electrodes comprises a plurality of pairs of electrodes.
3. The plasma device of embodiment 2, wherein each pair of electrodes includes a first type of electrode and a second type of electrode.
4. The plasma device of embodiment 3, wherein the first type of electrodes is configured to be powered by an RF signal and the second type of electrodes is configured to be grounded.
5. The plasma device of embodiment 3, wherein each first type of electrode includes a fluid outlet aperture positioned adjacent a fluid inlet aperture of the second type of electrode in its pair, and a fluid connector couples the fluid outlet aperture of the first type of electrode to the fluid inlet aperture of the second type of electrode.
6. The plasma device of embodiment 5, wherein each second type of electrode includes a fluid outlet aperture positioned adjacent a fluid inlet aperture of the first type of electrode in an adjacent pair of electrodes or positioned adjacent a coolant return.
7. The plasma device of embodiment 6, wherein each first type of electrode includes the fluid inlet aperture positioned adjacent a fluid outlet aperture of the second type of electrode in an adjacent pair of electrodes or positioned adjacent a coolant inlet.
8. The plasma device of embodiment 3, wherein the first type of electrodes and the second type of electrodes are both ring electrodes.
9. The plasma device of embodiment 2, wherein the plasma discharge tube comprises glass, fused silica, or alumina.
10. A plasma system comprising:
    an RF source; and
    the plasma device of embodiment 2, wherein the RF source is connected to each pair of electrodes to provide and RF signal to one of the electrodes of the pair, and the other electrode of the pair is grounded.
11. The plasma system of embodiment 10, further comprising a matching network between the RF source and the pairs of electrodes to match impedance between the RF source and the pairs of electrodes.

Definitions

Examples of chemical agents are described herein.

R groups can be optionally substituted with one or more groups independently selected from the group consisting of hydroxyl; C1-10alkyl hydroxyl; amine; C1-10carboxylic acid; C1-10carboxyl; straight chain or branched C1-10alkyl, optionally containing unsaturation; a $C_2$-10cycloalkyl optionally containing unsaturation or one oxygen or nitrogen atom; straight chain or branched C1-10alkyl amine; heterocyclyl; heterocyclic amine; and aryl comprising a phenyl; heteroaryl containing from 1 to 4 N, O, or S atoms; unsubstituted phenyl ring; substituted phenyl ring; unsubstituted heterocyclyl; and substituted heterocyclyl, wherein the unsubstituted phenyl ring or substituted phenyl ring can be optionally substituted with one or more groups independently selected from the group consisting of hydroxyl; C1-10alkyl hydroxyl; amine; C1-10carboxylic acid; C1-10carboxyl; straight chain or branched C1-10alkyl, optionally containing unsaturation; straight chain or branched C1-10alkyl amine, optionally containing unsaturation; a $C_2$-10cycloalkyl optionally containing unsaturation or one oxygen or nitrogen atom; straight chain or branched C1-10alkyl amine; heterocyclyl; heterocyclic amine; aryl comprising a phenyl; and heteroaryl containing from 1 to 4 N, O, or S atoms; and the unsubstituted heterocyclyl or substituted heterocyclyl can be optionally substituted with one or more groups independently selected from the group consisting of hydroxyl; C1-10alkyl hydroxyl; amine; C1-10carboxylic acid; C1-10carboxyl; straight chain or branched C1-10alkyl, optionally containing unsaturation; straight chain or branched C1-10alkyl amine, optionally containing unsaturation; a C2-10cycloalkyl optionally containing unsaturation or one oxygen or nitrogen atom; heterocyclyl; straight chain or branched C1-10alkyl amine; heterocyclic amine; and aryl comprising a phenyl; and heteroaryl containing from 1 to 4 N, O, or S atoms. Any of the above can be further optionally substituted.

The term "imine" or "imino", as used herein, unless otherwise indicated, can include a functional group or chemical compound containing a carbon-nitrogen double bond. The expression "imino compound", as used herein, unless otherwise indicated, refers to a compound that includes an "imine" or an "imino" group as defined herein. The "imine" or "imino" group can be optionally substituted.

The term "hydroxyl", as used herein, unless otherwise indicated, can include —OH. The "hydroxyl" can be optionally substituted.

The terms "halogen" and "halo", as used herein, unless otherwise indicated, include chlorine, chloro, Cl; fluorine, fluoro, F; bromine, bromo, Br; or iodine, iodo, or I.

The term "acetamide", as used herein, is an organic compound with the formula $CH_3CONH_2$. The "acetamide" can be optionally substituted.

The term "aryl", as used herein, unless otherwise indicated, include a carbocyclic aromatic group. Examples of aryl groups include, but are not limited to, phenyl, benzyl, naphthyl, or anthracenyl. The "aryl" can be optionally substituted.

The terms "amine" and "amino", as used herein, unless otherwise indicated, include a functional group that contains a nitrogen atom with a lone pair of electrons and wherein one or more hydrogen atoms have been replaced by a substituent such as, but not limited to, an alkyl group or an aryl group. The "amine" or "amino" group can be optionally substituted.

The term "alkyl", as used herein, unless otherwise indicated, can include saturated monovalent hydrocarbon radicals having straight or branched moieties, such as but not limited to, methyl, ethyl, propyl, butyl, pentyl, hexyl, octyl groups, etc. Representative straight-chain lower alkyl groups include, but are not limited to, -methyl, -ethyl, -n-propyl, -n-butyl, -n-pentyl, -n-hexyl, -n-heptyl and -n-octyl; while branched lower alkyl groups include, but are not limited to, -isopropyl, -sec-butyl, -isobutyl, -tert-butyl, -isopentyl, 2-methylbutyl, 2-methylpentyl, 3-methylpentyl, 2,2-dimethylbutyl, 2,3-dimethylbutyl, 2,2-dimethylpentyl, 2,3-dimethylpentyl, 3,3-dimethylpentyl, 2,3,4-trimethylpentyl, 3-methylhexyl, 2,2-dimethylhexyl, 2,4-dimethylhexyl, 2,5-dimethylhexyl, 3,5-dimethylhexyl, 2,4-dimethylpentyl, 2-methylheptyl, 3-methylheptyl, unsaturated C1-10 alkyls include, but are not limited to, -vinyl, -allyl, -1-butenyl, -2-butenyl, -isobutylenyl, -1-pentenyl, -2-pentenyl, -3-methyl-1-butenyl, -2-methyl-2-butenyl, -2,3-dimethyl-2-butenyl, 1-hexyl, 2-hexyl, 3-hexyl, -acetylenyl, -propynyl, -1-butynyl, -2-butynyl, -1-pentynyl, -2-pentynyl, or -3-methyl-1 butynyl. An alkyl can be saturated, partially saturated, or unsaturated. The "alkyl" can be optionally substituted.

The term "carboxyl", as used herein, unless otherwise indicated, can include a functional group consisting of a carbon atom double bonded to an oxygen atom and single bonded to a hydroxyl group (—COOH). The "carboxyl" can be optionally substituted.

The term "alkenyl", as used herein, unless otherwise indicated, can include alkyl moieties having at least one carbon-carbon double bond wherein alkyl is as defined above and including E and Z isomers of said alkenyl moiety. An alkenyl can be partially saturated or unsaturated. The "alkenyl" can be optionally substituted.

The term "alkynyl", as used herein, unless otherwise indicated, can include alkyl moieties having at least one carbon-carbon triple bond wherein alkyl is as defined above. An alkynyl can be partially saturated or unsaturated. The "alkynyl" can be optionally substituted.

The term "acyl", as used herein, unless otherwise indicated, can include a functional group derived from an aliphatic carboxylic acid, by removal of the hydroxyl (—OH) group. The "acyl" can be optionally substituted.

The term "alkoxyl", as used herein, unless otherwise indicated, can include O-alkyl groups wherein alkyl is as defined above and O represents oxygen. Representative alkoxyl groups include, but are not limited to, —O-methyl, —O-ethyl, —O-n-propyl, —O-n-butyl, —O-n-pentyl, —O-n-hexyl, —O-n-heptyl, —O-n-octyl, —O-isopropyl, —O-sec-butyl, —O-isobutyl, —O-tert-butyl, —O-isopentyl, —O-2-methylbutyl, —O-2-methylpentyl, —O-3-methylpentyl, —O-2,2-dimethylbutyl, —O-2,3-dimethylbutyl, —O-2,2-dimethylpentyl, —O-2,3-dimethylpentyl, —O-3,3-dimethylpentyl, —O-2,3,4-trimethylpentyl, —O-3-methylhexyl, —O-2,2-dimethylhexyl, —O-2,4-dimethylhexyl, —O-2,5-dimethylhexyl, —O-3,5-dimethylhexyl, —O-2,4dimethylpentyl, —O-2-methylheptyl, —O-3-methylheptyl, —O-vinyl, —O-allyl, —O-1-butenyl, —O-2-butenyl, —O-isobutylenyl, —O-1-pentenyl, —O-2-pentenyl, —O-3-methyl-1-butenyl, —O-2-methyl-2-butenyl, —O-2,3-dimethyl-2-butenyl, —O-1-hexyl, —O-2-hexyl, —O-3-hexyl, —O-acetylenyl, —O-propynyl, —O-1-butynyl, —O-2-butynyl, —O-1-pentynyl, —O-2-pentynyl and —O-3-methyl-1-butynyl, —O-cyclopropyl, —O-cyclobutyl, —O-cyclopentyl, —O-cyclohexyl, —O-cycloheptyl, —O-cyclooctyl, —O-cyclononyl and —O-cyclodecyl, —O—CH2-cyclopropyl, —O—CH2-cyclobutyl, —O—CH2-cyclopentyl, —O—CH2-cyclohexyl, —O—CH2-cycloheptyl, —O—CH2-cyclooctyl, —O—$CH_2$-cyclononyl, —O—CH2-cyclodecyl, —O—(CH2)2-cyclopropyl, —O—(CH2)2-cyclobutyl, —O—(CH2)2-cyclopentyl, —O—(CH2)2-cyclohexyl, —O—(CH2)2-cycloheptyl, —O—(CH2)2-cyclooctyl, —O—(CH2)2-cyclononyl, or —O—(CH2)2-cyclodecyl. An alkoxyl can be saturated, partially saturated, or unsaturated. The "alkoxyl" can be optionally substituted.

The term "cycloalkyl", as used herein, unless otherwise indicated, can include an aromatic, a non-aromatic, saturated, partially saturated, or unsaturated, monocyclic or fused, spiro or unfused bicyclic or tricyclic hydrocarbon referred to herein containing a total of from 1 to 10 carbon atoms (e.g., 1 or 2 carbon atoms if there are other heteroatoms in the ring), preferably 3 to 8 ring carbon atoms. Examples of cycloalkyls include, but are not limited to, C3-10 cycloalkyl groups include, but are not limited to, -cyclopropyl, -cyclobutyl, -cyclopentyl, -cyclopentadienyl, -cyclohexyl, -cyclohexenyl, -1,3-cyclohexadienyl, -1,4-cyclohexadienyl, -cycloheptyl, -1,3-cycloheptadienyl, -1,3,5-cycloheptatrienyl, -cyclooctyl, and -cyclooctadienyl. The term "cycloalkyl" also can include -lower alkyl-cycloalkyl, wherein lower alkyl and cycloalkyl are as defined herein. Examples of -lower alkyl-cycloalkyl groups include, but are not limited to, —CH2-cyclopropyl, —CH2-cyclobutyl, —CH2-cyclopentyl, —CH2-cyclopentadienyl, —CH2-cyclohexyl, —CH2-cycloheptyl, or —CH2-cyclooctyl. The "cycloalkyl" can be optionally substituted. A "cycloheteroalkyl", as used herein, unless otherwise indicated, can include any of the above with a carbon substituted with a heteroatom (e.g., O, S, N).

The term "heterocyclic" or "heteroaryl", as used herein, unless otherwise indicated, can include an aromatic or non-aromatic cycloalkyl in which one to four of the ring carbon atoms are independently replaced with a heteroatom from the group consisting of O, S and N. Representative examples of a heterocycle include, but are not limited to, benzofuranyl, benzothiophene, indolyl, benzopyrazolyl, coumarinyl, isoquinolinyl, pyrrolyl, pyrrolidinyl, thiophenyl, furanyl, thiazolyl, imidazolyl, pyrazolyl, triazolyl, quinolinyl, pyrimidinyl, pyridinyl, pyridonyl, pyrazinyl, pyridazinyl, isothiazolyl, isoxazolyl, (1,4)-dioxane, (1,3)-dioxolane, 4,5-dihydro-1H-imidazolyl, or tetrazolyl. Heterocycles can be substituted or unsubstituted. Heterocycles can also be bonded at any ring atom (i.e., at any carbon atom or heteroatom of the heterocyclic ring). A heterocyclic can be saturated, partially saturated, or unsaturated. The "hetreocyclic" can be optionally substituted.

The term "indole", as used herein, is an aromatic heterocyclic organic compound with the formula $C_8H_7N$. It has a bicyclic structure, consisting of a six-membered benzene ring fused to a five-membered nitrogen-containing pyrrole ring. The "indole" can be optionally substituted.

The term "cyano", as used herein, unless otherwise indicated, can include a —CN group. The "cyano" can be optionally substituted.

The term "alcohol", as used herein, unless otherwise indicated, can include a compound in which the hydroxyl functional group (—OH) is bound to a carbon atom. In particular, this carbon center should be saturated, having single bonds to three other atoms. The "alcohol" can be optionally substituted.

The term "solvate" is intended to mean a solvate form of a specified compound that retains the effectiveness of such a compound. Examples of solvates include compounds of the disclosure in combination with, for example: water, isopropanol, ethanol, methanol, dimethylsulfoxide (DMSO), ethyl acetate, acetic acid, or ethanolamine.

The term "mmol", as used herein, is intended to mean millimole. The term "equiv", as used herein, is intended to mean equivalent. The term "mL", as used herein, is intended to mean milliliter. The term "g", as used herein, is intended to mean gram. The term "kg", as used herein, is intended to mean kilogram. The term "μg", as used herein, is intended to mean micrograms. The term "h", as used herein, is intended to mean hour. The term "min", as used herein, is intended to mean minute. The term "M", as used herein, is intended to mean molar. The term "μL", as used herein, is intended to mean microliter. The term "μM", as used herein, is intended to mean micromolar. The term "nM", as used herein, is intended to mean nanomolar. The term "N", as used herein, is intended to mean normal. The term "amu", as used herein, is intended to mean atomic mass unit. The term "° C.", as used herein, is intended to mean degree Celsius. The term "wt/wt", as used herein, is intended to mean weight/weight. The term "v/v", as used herein, is intended to mean volume/volume. The term "MS", as used herein, is intended to mean mass spectroscopy. The term "HPLC", as used herein, is intended to mean high performance liquid chromatography. The term "RT", as used herein, is intended to mean room temperature. The term "e.g.", as used herein, is intended to mean example. The term "N/A", as used herein, is intended to mean not tested.

The methods and algorithms of the disclosure may be enclosed in a controller or processor. Furthermore, methods and algorithms of the present disclosure, can be embodied as a computer-implemented method or methods for performing such computer-implemented method or methods, and can also be embodied in the form of a tangible or non-transitory computer-readable storage medium containing a computer program or other machine-readable instructions (herein "computer program"), wherein when the computer program is loaded into a computer or other processor (herein "computer") and/or is executed by the computer, the computer becomes an apparatus for practicing the method or methods. Storage media for containing such computer programs include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The method or methods can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the method or methods. The method or methods may be implemented on a general-purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, machines for reading the storage media mentioned above.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing from the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1. Methods to Achieve Sustained Operation of Plasmas Contained in Electrically Insulating Tubes This Example describes a method to achieve sustained operation of plasmas contained in electrically insulating tubes based on the discovery that chemical reactions in nonequilibrium plasmas are reversible.

Disclosed is a method to prevent short-circuiting of electrodes for plasmas contained within dielectric tubes, wherein the plasmas are used for the purpose of processing hydrocarbons. The method involves modulating the flow to have periods where the H2:CH4 ratio is very high (mostly hydrogen), and periods where the H2:CH4 ratio is less than 10:1 (more hydrocarbon FIG. 1A). Note that CH4 is merely an exemplary hydrocarbon vapor/gas, but the present disclosure is broadly applicable to hydrocarbon vapors/gases.

Nonequilibrium plasmas, which are highly reactive partially ionized gasses, are attractive for chemical processing driven by electricity. It is often desirable to isolate the metallic electrodes used to generate the plasma from the chemically reactive flow. This isolation prevents deterioration of the electrodes and contamination of the flow. The isolation of the electrodes from the flow can be accomplished by means of an electrically insulating dielectric tube, for example comprised of glass, fused silica or alumina. The plasma is effectively contained within this dielectric tube in the vicinity of the electrodes that are used to generate the discharge. The electrodes are driven by a high frequency, high voltage signal that alternates periodically with a frequency in the radiofrequency or microwave range, from 0.1 to 10,000 megaHertz (MHz). Since the electrical current alternates with this high frequency, it can easily pass through the walls of the dielectric tube and be coupled to the plasma.

Figure 2A:
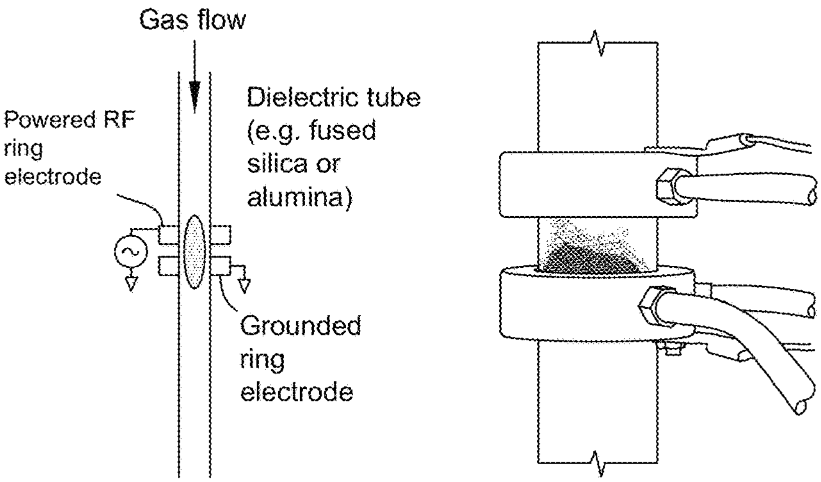
FIG. 2A depicts a dielectric tube passing through two ring electrodes in accordance with the present disclosure.
Figure 2B:
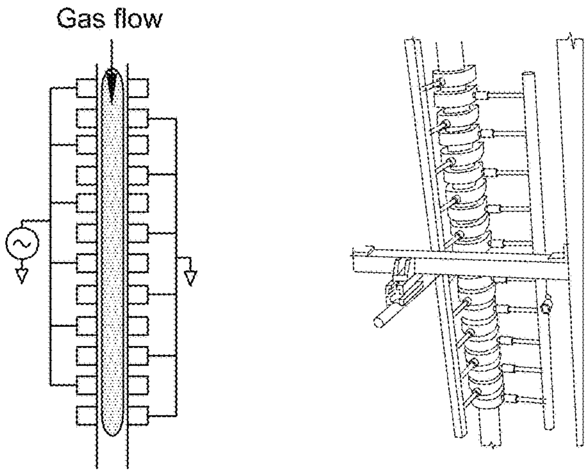
FIG. 2B depicts a dielectric tube passing through several ring electrode pairs in series in accordance with the present disclosure.
Figure 2C:
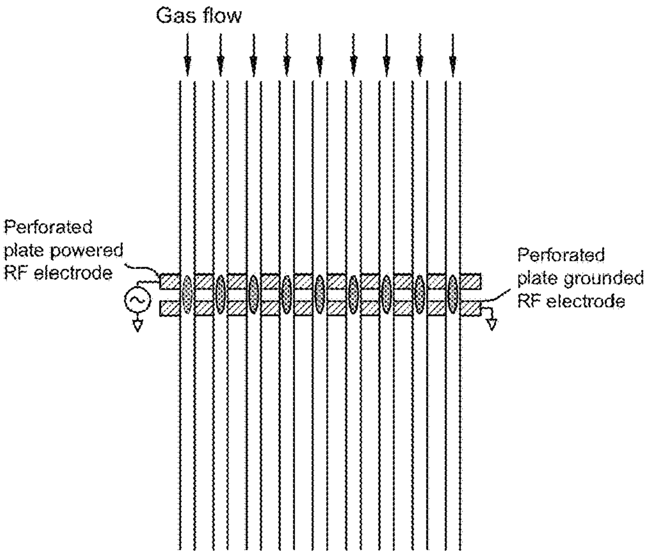
FIG. 2C depicts several dielectric tubes in parallel passing through a pair of perforated sheet electrodes in accordance with the present disclosure.
Figure 2D:
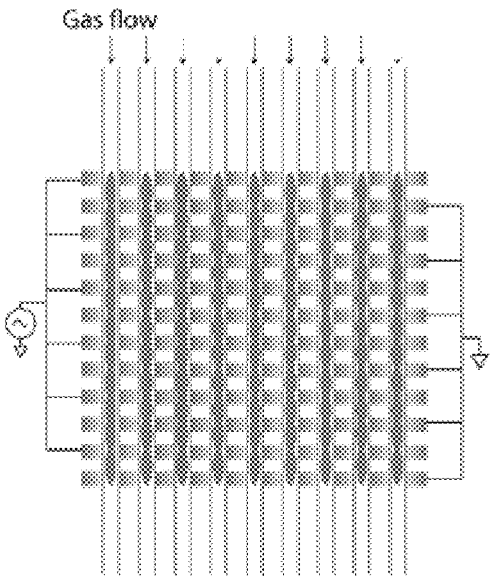
FIG. 2D depicts several perforated sheet electrodes with parallel dielectric tubes passing through them in accordance with the present disclosure.
Figure 2E:
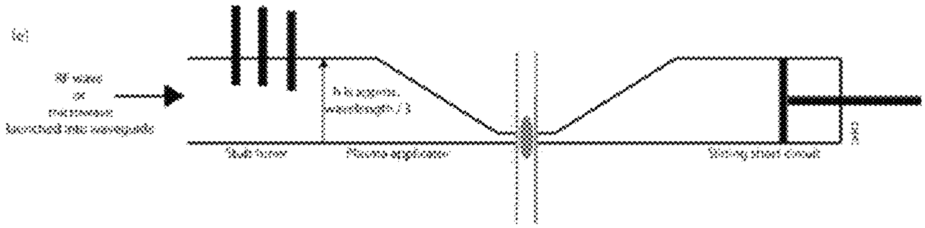
FIG. 2E depicts a waveguide with reduced height section for exciting the plasma in a dielectric tube that passes through the waveguide in accordance with the present disclosure.

There are various electrode and tube configurations to which the present disclosure is applicable. Some examples, which are not meant to be restrictive, are provided in FIGS. 2A-2E. For example, the dielectric tube can pass through a pair of electrode rings that are aligned coaxially (FIG. 2A). Alternatively, the tube can pass through the center of many electrode pairs that are aligned coaxially, which are alternately biased by the high frequency voltage or grounded (FIG. 2B). Yet another configuration is to have a pair of perforated plate electrodes, with many tubes in parallel passing through them (FIG. 2C). The plasma volume can be increased by having many pairs of perforated plates, which are alternately biased by the high frequency voltage or grounded (FIG. 2D). Finally, there is a configuration where the high frequency signal is coupled to a waveguide, which has elements included for impedance matching, as well as a section of reduced height that excites the plasma contained within a dielectric tube that passes through the waveguide (FIG. 2E).

Research in recent years has focused on reforming hydrocarbon gasses and vapors in plasmas for the purpose of synthesizing organic products as well as hydrogen gas without CO2 emission. One example is the synthesis of acetylene (C2H2) from methane (CH4), which comprises approximately 90% of natural gas by volume. The synthesis of acetylene from methane also generates hydrogen by the overall reaction: CH4→½C2H2+3/2H2. This reaction is more energy efficient and has a higher yield when excess hydrogen is present. The H2:CH4 ratio in the feed is typically on the order of 1:1, but could be as high as 10:1.

The challenge is that even though more than 90% of the carbon in the methane can react to make the desired chemical product, for example C2H2, some small amount always makes a solid carbon byproduct. From the experiments, it is not possible to completely suppress this solid carbon formation over long periods of reactor run time while simultaneously maintaining a high production rate, which is only possible when the H2:CH4 ratio in the feed is less than 10:1. When the plasma is contained within a dielectric tube, a portion of this solid carbon deposits on the reactor walls, effectively fouling the reactor.

Figure 3A:
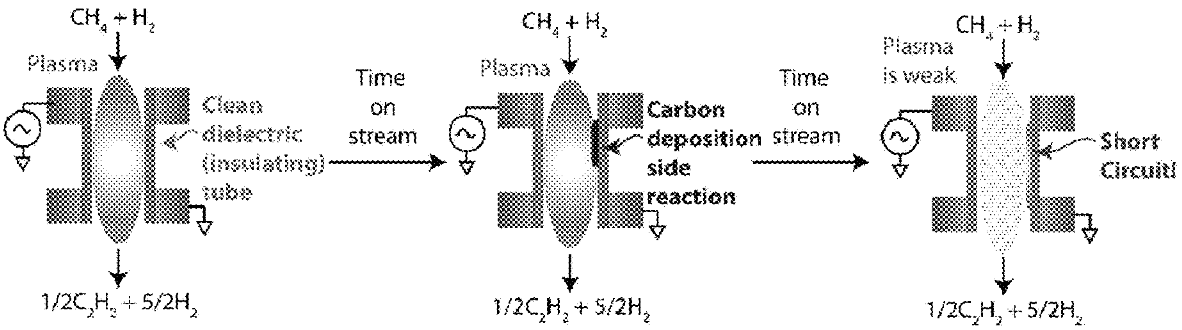
FIG. 3A depicts that, as time proceeds while synthesizing $C_2H_2$ from $CH_4$, carbon builds up on the wall of the dielectric tube and eventually short-circuits the electrodes, causing the plasma to become weak and the chemical production reaction to slow down or stop.
Figure 3B:
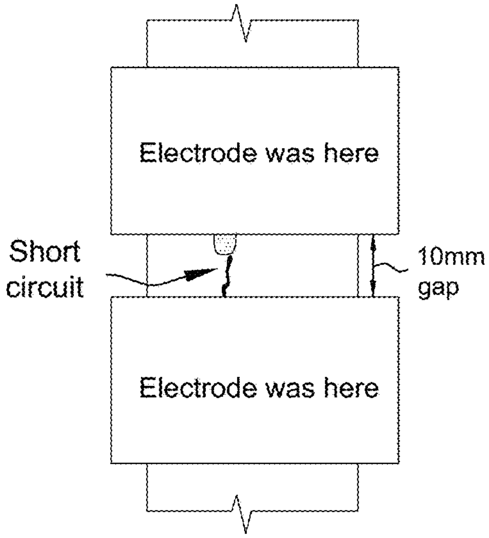
FIG. 3B depicts an example photograph of reactor tubes after the gap between the electrodes was short-circuited by the deposition of carbon.
Figure 3C:
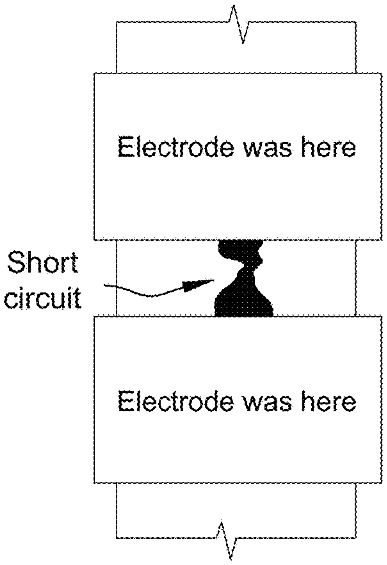
FIG. 3C depicts an example photograph of reactor tubes after the gap between the electrodes was short-circuited by the deposition of carbon.

The problem is that for long reactor run times, the minor solid carbon byproduct builds up on the walls of the dielectric tube in the gap, and eventually short-circuits the electrodes that are used to generate the plasma, causing the plasma to become weaker and eventually extinguish (FIGS. 3A-3C). The present disclosure is a solution to this problem.

Figure 1B:
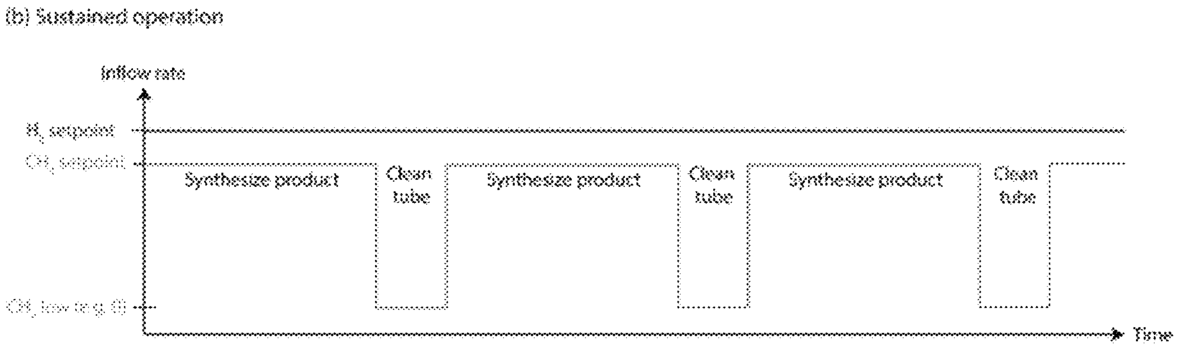
FIG. 1B depicts that sustained plasma operation can be achieved by modulating the flow of $CH_4$ to have periods where it is high and products are synthesized, and periods where it is low and the tube is cleaned, in accordance with the present disclosure.

It has recently been discovered that chemical reactions in nonequilibrium plasmas are reversible. Therefore, if the carbon feed to the reactor is suspended, and only a H2 plasma is used in the tube, then the carbon buildup on the walls reacts to make gaseous hydrocarbons that can be removed from the flow system. Therefore, by modulating the CH4 flow to have time periods where the chemical product is synthesized (CH4+H2 in the feed), and time periods when the tube is cleaned (H2 only in the feed), short-circuits can be prevented and long-term reactor operation can be achieved (FIG. 1B).

Example 2. Nonequilibrium Plasma Synthesis of Structural Carbon Materials From Methane for Hydrogen Production This Example describes a method of producing hydrogen (H2) and acrylonitrile (C2H3CN) by nonequilibrium plasma synthesis.

A goal of this aspect is to develop a nonequilibrium plasma process to produce hydrogen from natural gas without intrinsic CO2 emission, the economics of which are driven by the carbonaceous coproduct. More specifically, the process may be economically viable based upon sale of the carbonaceous coproduct alone, and thus the hydrogen is considered as a byproduct that adds value, but the sale of which is not required for viability. The nonequilibrium plasma process may be driven using electricity from renewable generators such as wind turbines. To envision a meaningful impact for the produced hydrogen on CO2 emissions, the scale of the market for the carbonaceous coproduct must be immense. Of the various markets for manufactured materials, structural materials that are used in construction of the built environment, for example steel and concrete, are produced on a scale of billions of tons per year, which is comparable to fossil fuel consumption. To ensure that the market is large enough to make an impact in the best-case scenario, carbonaceous coproducts will be targeted that are useful for structural applications. More specifically, the focus will be on the synthesis of materials of relevance for manufacturing carbon fiber-reinforced composites.

Figure 4:
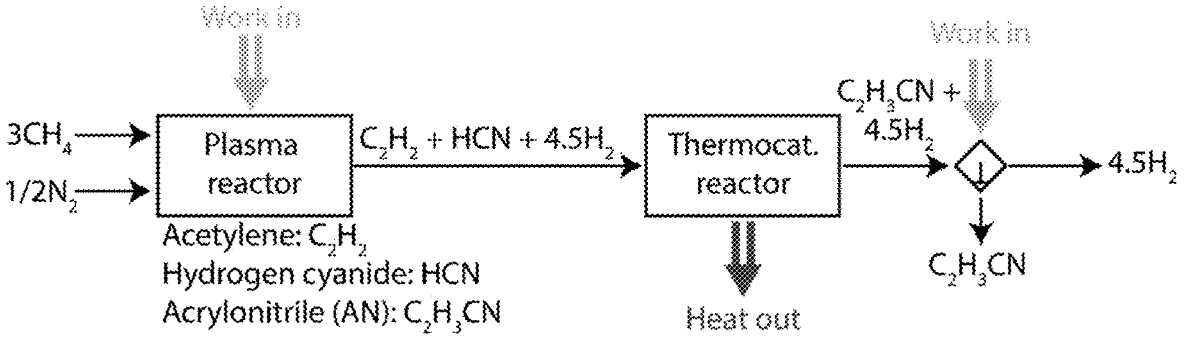
FIG. 4 depicts a process concept in accordance with the present disclosure. A mixture of acetylene, hydrogen cyanide and hydrogen is synthesized from methane and nitrogen by an endothermic reaction using an electricity input via nonequilibrium plasma. In a subsequent thermocatalytic step, the acetylene and hydrogen cyanide participate in an exothermic reaction to synthesize acrylonitrile. The hydrogen is then separated from the acrylonitrile by e.g. condensation or membrane separation.

This aspect targets as an example the nonequilibrium plasma synthesis of acrylonitrile (AN, C2H3CN) from methane (CH4), which comprises 75 to 90 mol. % of natural gas, and nitrogen (N2). Acrylonitrile (AN) is a critical intermediate in well-established synthesis processes for carbon fiber, which involve first polymerizing it to polyacrylonitrile (PAN), and then spinning fibers from the PAN that are subsequently graphitized. AN is a commodity chemical that typically has a price in the range from $1,500 to $3,000 per tonne. The process involves synthesizing the AN from acetylene and hydrogen cyanide intermediates, which in turn are synthesized from methane and nitrogen gas by a nonequilibrium plasma (FIG. 4). Hydrogen cyanide (HCN) is a dangerous, poisonous gas that must be dealt with carefully. It has an OSHA 8-hour permissible exposure limit of 10 ppm, and an LC50 of 524 ppm for 10 minutes. Fortunately, it can be destroyed by combustion, and therefore flame-treatment of the exhaust is effective for removing any small amounts of HCN leaving the process. Furthermore, the HCN will ideally only be present in-situ in the line between the plasma reactor and the thermocatalytic reactor (FIG. 4), and therefore transporting and storing large quantities of HCN will not be required.

Acrylonitrile is currently synthesized industrially by ammoxidation of propene via the following overall reaction C3H6+NH3+3/2O2→AN+3H2O. Since ammonia is produced by the reaction of nitrogen gas with hydrogen gas via the Haber-Bosch process, synthesis of AN by ammoxidation consumes hydrogen. This is what sets the present process apart from conventional processes: conventional processes consume hydrogen while the present process produces hydrogen. Historically, the thermo-catalytic synthesis of AN from C2H2 and HCN, which is a highly exothermic reaction that proceeds readily in the presence of a catalyst, was explored. Ultimately the process was abandoned, in part because of the hazards of storing and handling large quantities of HCN, and in part because of the high cost of purchasing acetylene. That is what sets the present process apart from the historical approach of hydrocyanation of acetylene: the present process produces and consumes the HCN in-situ so it does not require transportation or storage of that poisonous chemical, and it consumes a methane input not an acetylene input.

Both the synthesis of acetylene (C2H2) from CH4; and the synthesis of HCN from CH4+N2; are endothermic reactions. In fact, these reactions are very endothermic, with 2CH4→C2H2+3H2 and CH4+½ N2→HCN+3/2H2 having enthalpies of reaction 376.5 kJ gmol-1 and 210.0 kJ gmol-1 respectively. Since the reactions are so endothermic, they only occur at very high temperatures in systems governed by local equilibrium. For that reason, thermal plasmas, in which the entire gas stream is heated up to several thousands of ° C. by an electrical arc, have attracted attention for decades in this context, since they provide much higher yield than processes based on partial oxidation. The acetylene synthesis reaction in thermal plasmas is relatively well developed. The electricity input to the plasma is the largest single cost driver for plasma-chemical synthesis processes, accounting for approximately 50% of the cost per mass of product. As such, the specific energy requirement, which is the electricity used by the plasma per unit mass of product, is the most important single parameter for doing technoeconomic assessments, since it determines other major cost drivers such as the cost of the high frequency power supplies.

The champion thermal plasma processes for the synthesis of acetylene and hydrogen from methane have specific energy requirements of approximately 9 kWh per kgC2H2. This input is approximately 2.25 times the enthalpy of reaction (376.5 kJ/gmolC2H2=4.022 kWh/kgC2H2). Considering that the energy requirement to heat the methane from room temperature to the reaction temperature is similar to the enthalpy of reaction, this number of 9 kWh per kgC2H2 is probably close to the theoretical limit for a process governed by local equilibrium such as a thermal plasma. The below table depicts benchmarks for $C_2H_2$ and HCN synthesis by microwave (MW) plasma.

| Product | Plasma type | SER by thermal plasma | $\Delta H_R$ at T = 298K |
|---|---|---|---|
| $C_2H_2$ | Thermal | 9 kWh/kg | 4.0 kWh/kg |
| $C_2H_2$ | Nonequilibrium MW | 6.2 to 7.2 kWh/kg | 4.0 kWh/kg |
| HCN | Thermal | 34 to 70 kWh/kg | 2.2 kWh/kg |

The reaction $CH_4+½N_2$→HCN has also been studied by thermal plasma, although the cyanide synthesis reaction has received less attention and is therefore under developed. The champion processes that have been reported have specific energy requirements in the range of 34 to 70 kWh per kg of HCN. These SER values are much higher than the enthalpy of reaction (210.0 kJ/gmolHCN=2.160 kWh/kgHCN). Further process optimization could probably lower the specific energy requirement of HCN by thermal plasma, but again the entire gas must be heated to a very high temperature, which suggests that the ultimate specific energy input of an optimized thermal plasma process would likely be similar to acetylene, slightly less than 10 kWh per kg HCN.

As endothermic products favored at high temperature, both C2H2 and HCN are unstable at relatively low temperatures after the plasma zone, which makes the quenching process critical in thermal plasmas. In practice, quenching is often accomplished by injecting copious amounts of low temperature fluid. This quenching process via fluid injection, necessary to control recombination of the products from a thermal plasma, drastically lowers the temperature of the out-flow by design, which limits opportunities for heat recovery from the plasma effluent. It would therefore be advantageous if the entire gas could remain at a lower temperature during the synthesis reaction, and the process could be driven by an environment that is not governed by local equilibrium, such as a nonequilibrium plasma. There is preliminary experimental evidence in the literature that nonequilibrium plasma generated by continuous microwave is more energy efficient than thermal plasmas for the synthesis of acetylene from methane. Furthermore, data from the experiments disclosed demonstrate that nonequilibrium plasma is feasible for both C2H2 and HCN synthesis from methane, and there are pathways to decreasing the specific energy requirement, perhaps to less than the benchmark values reported in the literature for thermal plasmas.

HCN is an abundantly available feedstock that is useful for the synthesis of organonitrile intermediates which serve as precursors for amines, amides, isocyanates, carboxylic acids, and esters. Until the late 1960s, the major industrial synthesis of AN involved either the addition of HCN to C2H2 at high temperature, or addition in the presence of a Cu(I)-catalyst at 70-90° C. This catalyst composition has a number of disadvantages: low productivity of 12-15 g per liter of catalyst per hour, therefore, low catalyst activity and insufficient rate of acetylene dissolution, as well as a short service life. The desired reaction of C2H2 with HCN cannot be favored by maintaining a large excess of HCN in the catalyst solution, because this deactivates the catalyst. A large excess of C2H2 must be used in the feed for this legacy homogenous catalyst, since a much higher partial pressure of C2H2 is required to compensate for the difference in solubility of C2H2 and HCN in the liquid. Since this catalyst solution is very similar to the Nieuwland catalyst system, it is not surprising that vinylacetylene, divinylacetylene, chlorobutadiene, cyanobutadiene, and other impurities are also formed. Studies of catalysts in non-aqueous media led to an increase in their activity and selectivity in comparison with aqueous media. It has been shown that the composition of the CuCl—N-methyl pyrrolidone (NMP)-dimethylformamide (DMF) catalyst is characterized by high activity (up to 32 g/l/h) and selectivity (83-90%), i.e., the activity of this composition is almost twice as high as compared to the water-based ones (12-18 g/l/h).

As for the gas phase synthesis of AN with C2H2 and HCN at 450 to 700° C., the heterogenous catalysts are made from 3-15 wt. % of either an alkali metal hydroxide, cyanide or carbonate, supported on a porous carbonaceous support. For example, AN has been prepared with C2H2 and HCN at around 400° C., using pumice stone supported zinc hydroxide. However, very little research has been done in the area of gas-phase synthesis of AN from C2H2 and HCN using heterogenous catalysts.

Several experiments were performed to establish the feasibility of the present work. There are three main conclusions from these experiments: 1) C2H2+HCN mixtures can be synthesized by the nonequilibrium plasma reactor, 2) at least one scaling parameter has been identified that is expected to allow realization of an economically viable specific energy requirement for the plasma, and 3) catalyst modification strategies to ameliorate inactivation due to coking have been demonstrated.

Figure 5B:
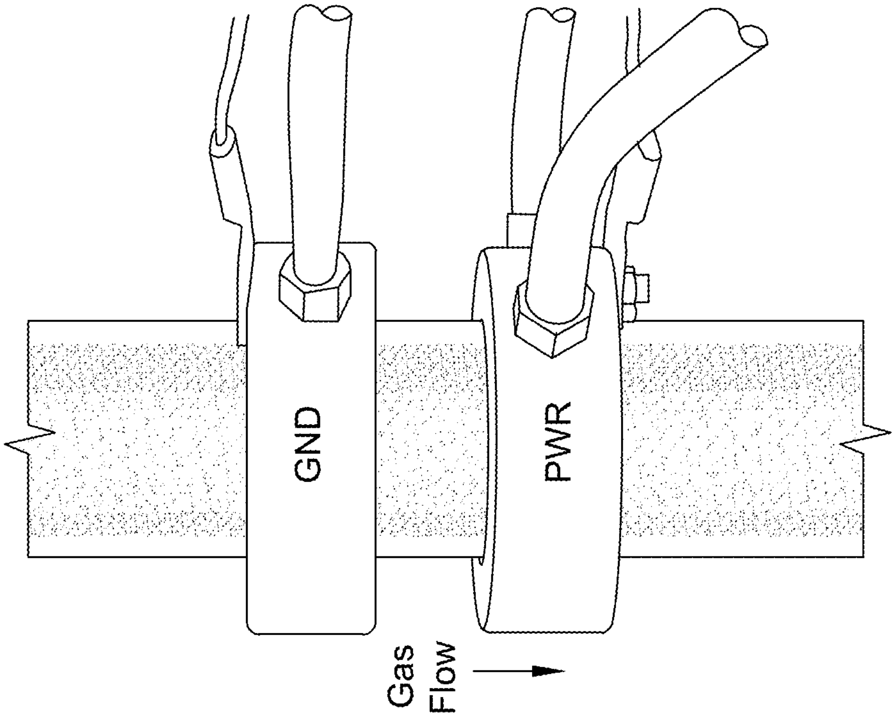
FIG. 5B depicts a digital photograph of a nonequilibrium RF plasma reactor during operation in accordance with the present disclosure when the plasma is off. Powered electrode (PWR) and ground electrode (GND). Cooling water (CW). Pressure was 80 Torr. The excitation frequency was 13.56 MHz. For scale, the glass tube is 38 mm outer diameter.
Figure 5A:
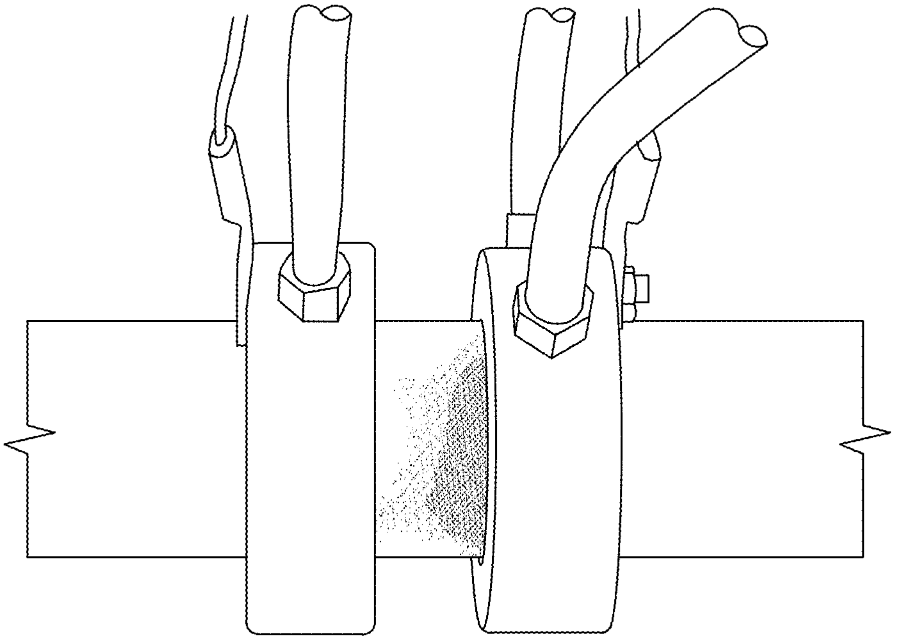
FIG. 5A depicts a digital photograph of a nonequilibrium RF plasma reactor during operation in accordance with the present disclosure when the plasma is on. Powered electrode (PWR) and ground electrode (GND). Cooling water (CW). Pressure was 80 Torr. The excitation frequency was 13.56 MHz. For scale, the glass tube is 38 mm outer diameter.

The reactor used for the preliminary work employed a radiofrequency (RF) nonequilibrium plasma generated using 13.56 MHz excitation (FIGS. 5A-5B). The reactor was fed mixtures of hydrogen, methane, and nitrogen with trace amounts of Ar to facilitate product quantification by gas chromatography. The reaction pressure was in the range from 50 to 100 Torr. One experiment was conducted to illustrate the effect on the product distribution of adding nitrogen to a methane/hydrogen plasma, while another experiment was conducted to examine the effect of throughput on the specific energy requirement of the products of reaction.

Figure 6A:
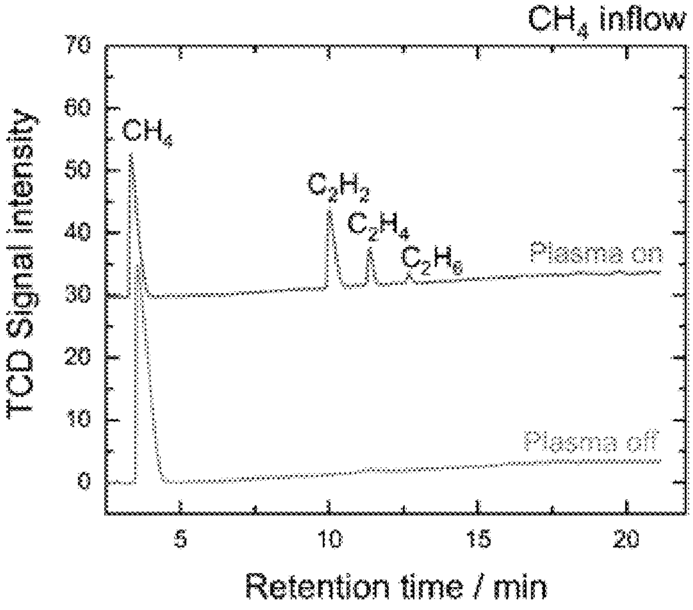
FIG. 6A depicts gas chromatograms of the reactor effluent without $N_2$ added to the influent for the synthesis of $C_2H_2$+HCN mixtures in accordance with the present disclosure. The plots have been offset for clarity. The bottom curve is the chromatogram with the plasma off, and the top curve is with the plasma on. The influent composition was $H_2$=400 cubic centimeters per minute at standard temperature and pressure (SCCM), $CH_4$=280 SCCM, $N_2$=0, and Ar=76 SCCM.
Figure 6B:
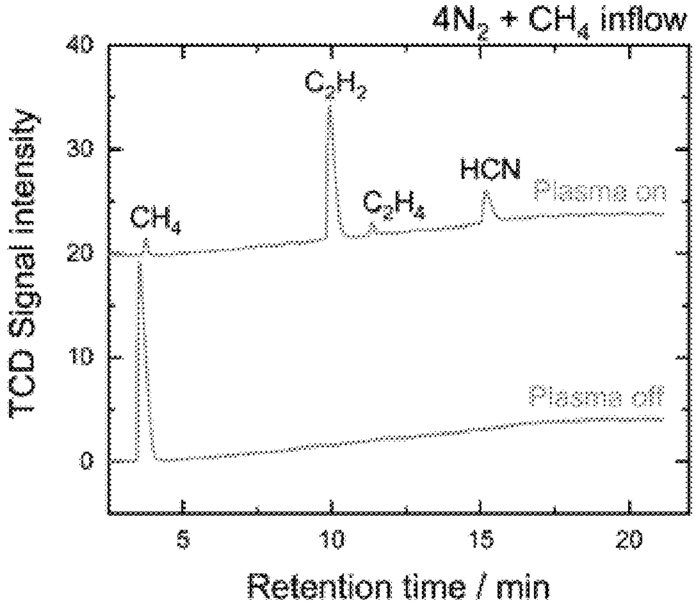
FIG. 6B depicts gas chromatograms of the reactor effluent with $N_2$ added to the influent for the synthesis of $C_2H_2$+HCN mixtures in accordance with the present disclosure. The plots have been offset for clarity. The bottom curve is the chromatogram with the plasma off, and the top curve is with the plasma on. The influent composition was $H_2$=150 SCCM, $CH_4$=100 SCCM, $N_2$=400 SCCM, and Ar=76 SCCM.

The addition of N2 to a CH4+H2 feed gas results in the synthesis of C2H2+HCN. Dilution with hydrogen serves several purposes. First, it ameliorates fouling of the reactor by solid phase carbon, which appears as a black deposit on the reactor walls. It is critical to suppress deposition of elemental carbon, particularly between the RF electrodes. If left unabated, carbon deposition between the electrodes will eventually short out the excitation circuit and prevent generation of the plasma. Thus, all experiments were conducted with hydrogen dilution in a ratio of approximately 1:1 based on methane. The hydrogen dilution is an important parameter, and its precise optimization will be the subject of future work. In an industrial system, this dilution hydrogen could be supplied via a recycle stream from the hydrogen that is produced by the reaction (FIG. 4). In the absence of N2 in the reactor feed gas, ignition of the plasma results in a decrease in CH4 peak intensity and the appearance of peaks at retention times in the range from 10 to 13 minutes, which a calibration revealed as the C2 series of acetylene to ethane, with larger retention times corresponding to greater levels of hydrogenation (FIG. 6A). Upon addition of N2 to the feed gas in a ratio of 4:1 based on methane, the conversion of CH4 increased, the yield of acetylene increased, and a new peak appeared at a retention time of approximately 15 minutes, which is HCN (FIG. 6B). Additional experiments conducted changing the N2:CH4 ratio (not shown here) revealed that the HCN:C2H2 molar ratio in the effluent could be tuned in the range from approximately 1:2 to 1:10, and a useful ratio may be 1:1 for HCN:C2H2. Conversion of methane >90% has been routinely achieved, with selectivity based on reacted carbon for C2H2 of approximately 75% and selectivity for HCN of 24%, which corresponds to a molar ratio of approximately HCN:C2H2 of 1:2. The carbon byproducts are relatively minor, mostly ethylene and unaccounted for carbon (presumably elemental carbon aerosol and coke). The production rate of C2H2+HCN is in the range 1 to 10 grams per hour at the current operational conditions.

Figure 7:
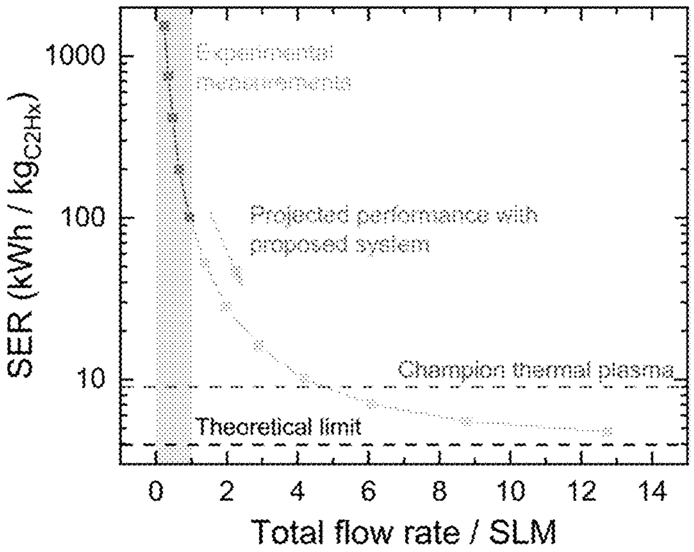
FIG. 7 depicts the specific energy requirement (SER) with increasing throughput. All C2 hydrocarbons were included in the calculation of mass, however in all cases $C_2H_2$ was the dominant species (data not shown here). The ratio of the input RF power to the total flow rate was held constant as the flow rate was increased. Therefore, higher flow rates had higher input power. Liters per minute at standard temperature and pressure (SLM).

The specific energy requirement of the process increases with throughput, meaning the reaction becomes more energy-efficient at higher production rates. This observation is very encouraging for scale-up. A series of experiments was performed in which the total flow rate and power were changed proportionally, such that the ratio of the RF power input to the total flow rate was constant. This series of experiments was performed with an influent mixture of 53% H2, 37% CH4, and 10% Ar. Argon was added primarily as a tracer gas to aid in quantification by gas chromatography. No nitrogen was added and thus the focus was on the synthesis of C2 hydrocarbon species. The addition of nitrogen is expected to enhance conversion of methane and desired product yield (FIGS. 6A-6B), so the trend observed here is expected to be preserved for the synthesis of C2H2+HCN mixtures, and experiments not shown here support that hypothesis. The specific energy requirement to synthesize acetylene from methane dropped precipitously with increasing total flow rate (FIG. 7). It is extrapolated that the process will surpass the champion thermal plasma process at a total flow rate of approximately 5 standard liters per minute (SLM), which would require a power input of approximately 4 kW; and approach the theoretical limit at a total flow rate of approximately 10 SLM, which would require a power of 7 to 8 kW. Testing the extrapolation in FIG. 7 will require a larger reactor, and that new reactor must be capable of handling flows and RF power that are approximately 10 times larger than the current bench-scale reactor.

The development of this process will make use of rich experience in high temperature reactions such as $CO_2$ hydrogenation and dry reforming of methane (DRM), which are reactions that face similar challenges to the synthesis of AN from acetylene and hydrogen cyanide. For example, DRM usually takes place at temperatures above 600° C., which is also the temperature required for AN synthesis. High activity and high stability nickel (Ni)-based catalysts (~3 nm Ni average particle size) have been prepared using atomic layer deposition (ALD) method. The obtained catalysts exhibited a stronger NiO—$Al_2O_3$ interaction than catalysts prepared by the conventional incipient wetness (IW) method. Supported nickel catalysts are expected to be relevant for AN synthesis. Due to the paucity of literature of heterogenous catalytic AN synthesis, an analogy can be drawn to acetylene oligomerization for the purpose of identifying expected challenges. For example, Ni/$SiO_2$ catalysts have been shown to be effective for the synthesis of hydrocarbon liquids from acetylene in hydrogen gas ambient at 140° C. One of the known challenges using heterogenous Ni catalysts for acetylene oligomerization is coking of the catalyst surface, which causes inactivation. Therefore, it is expected that in AN synthesis by acetylene hydrocyanation, coking will also be a challenge. This challenge may be met by developing methods to ameliorate catalyst inactivation by coking. DRM is used as an example reaction to illustrate those methods to make the catalyst more robust, because coking is also a major challenge in DRM.

Figure 8:
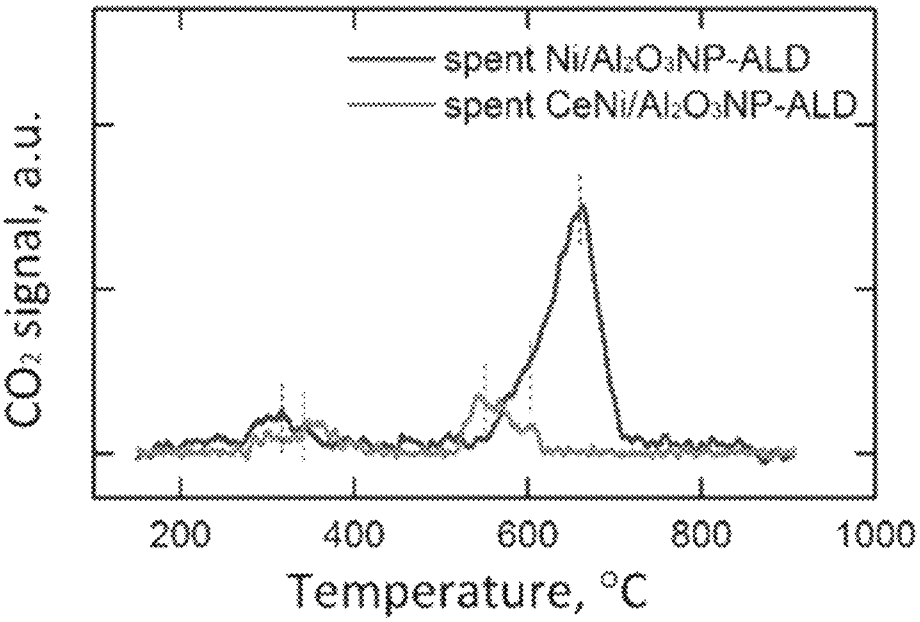
FIG. 8 depicts TPO profiles of spent Ni/$Al_2O_3$NP-ALD and CeNi/$Al_2O_3$NP-ALD after 72 h of DRM at 850° C. in accordance with the present disclosure.

Modification of a Ni catalyst using $CeO_2$ can make it resistant to coking. $CeO_2$ contains a high concentration of highly mobile oxygen that acts as an oxygen source for reactions carried out on its surface, which is helpful in reducing coke formation on the catalyst surface. To verify this, a Ni-based $Al_2O_3$ hollow fiber (HF) catalysts, with and without $CeO_2$, were analyzed after two cycles of reaction (one cycle of reaction consisted of 72 h of DRM reaction at 850° C. and 72 h of reaction at 800° C.). The notation CeNi means that nickel catalyst was modified with $CeO_2$. The amount of carbon on the catalyst surface, after DRM reaction, decreased as the amount of Ce used to prepare the catalyst increased. The average surface carbon content of Ni/$Al_2O_3$HF-ALD, 0.25CeNi/$Al_2O_3$HF-ALD, 0.42CeNi/$Al_2O_3$HF-ALD, and 0.75CeNi/$Al_2O_3$HF-ALD was 7.4 wt. %, 3.6 wt. %, 3.3 wt. %, and 2.5 wt. %, respectively, indicating that $CeO_2$ inhibited coke formation. The coke inhibiting capability of $CeO_2$ could be also ascribed to the enhanced dissociative adsorption of $CO_2$ on $CeO_2$. Oxygen temperature-programmed oxidation (TPO) was conducted to further study the carbon deposition on spent Ni/$Al_2O_3$NP-ALD and CeNi/$Al_2O_3$NP-ALD, after DRM reaction at 850° C. for 72 h, as shown in FIG. 8. Peaks that appeared below 300° C. for both catalysts could be related to carbidic carbon ($C\alpha$) on nickel. The higher temperature of the carbon species could be ascribed to amorphous carbon ($C\beta$), 605° C. for Ni/$Al_2O_3$NP-ALD and 565° C. for CeNi/$Al_2O_3$NP-ALD, respectively. The lower oxidation temperature for the $CeO_2$ promoted catalysts could be due to the oxygen storage and release capacity of $CeO_2$. In addition, the notable peak at 660° C. for Ni/$Al_2O_3$NP-ALD could be ascribed to graphitic carbon ($C\gamma$), whereas no $C\gamma$ peak was detected for CeNi/$Al_2O_3$NP-ALD. This result means that $CeO_2$ can have a strong effect on coke formation during reaction, especially inhibiting problematic graphitic carbon.

Figure 9A:
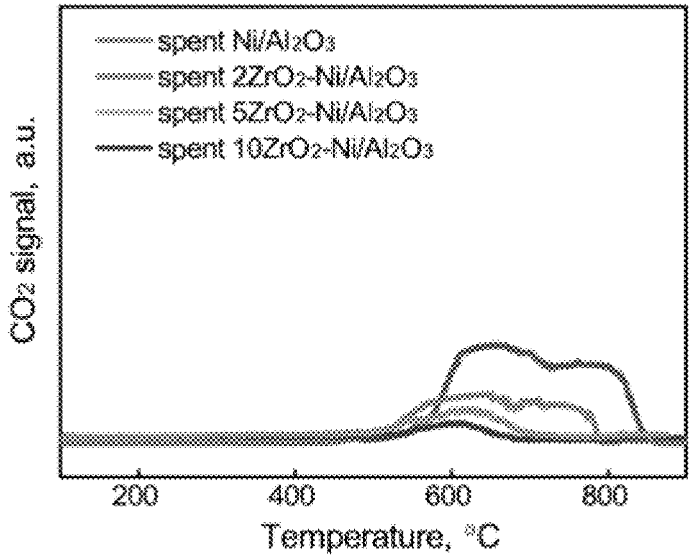
FIG. 9A depicts TPO profiles of spent Ni/$Al_2O_3$, spent 2$ZrO_2$—Ni/$Al_2O_3$, spent 5$ZrO_2$—Ni/$Al_2O_3$, and spent 10$ZrO_2$—Ni/$Al_2O_3$ after DRM at 800° C. for 48 h and 700° C. for 48 h sequentially in accordance with the present disclosure.
Figure 9B:
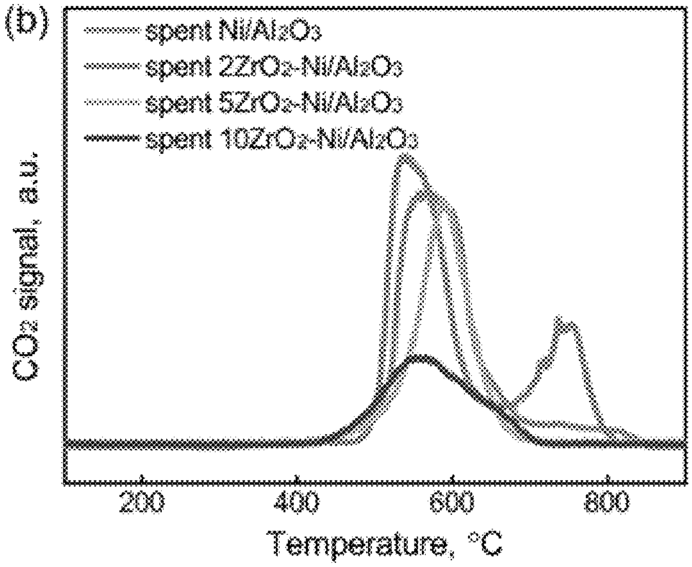
FIG. 9B depicts TPO profiles of spent Ni/$Al_2O_3$, spent 2$ZrO_2$—Ni/$Al_2O_3$, spent 5$ZrO_2$—Ni/$Al_2O_3$, and spent 10$ZrO_2$—Ni/$Al_2O_3$ after DRM at 600° C. for 100 h in accordance with the present disclosure.

To illustrate the different options for modifying supported Ni catalysts to make them resistant to inactivation by coking, $ZrO_2$ was also studied due to its thermal stability and basicity, and the deficient oxygen vacancies on $ZrO_2$ can serve as oxygen transfer sites for catalytic reactions. Various cycles of $ZrO_2$ ALD were deposited on the pristine Ni/$Al_2O_3$ catalysts using ALD. DRM was conducted at low temperature (600° C.) and high temperature (above 700° C.). $O_2$-TPO was applied to study the carbon deposition after DRM. For the spent catalysts after high-temperature DRM, only small peaks appeared at approximately 610° C. for the 5$ZrO_2$-Ni/$Al_2O_3$ catalyst or at approximately 625° C. for the spent 10$ZrO_2$-Ni/$Al_2O_3$ catalyst (FIG. 9A). However, broad peaks were found for the spent Ni/$Al_2O_3$ catalyst; the $CO_2$ signal peak (550° C. to 830° C.) for the spent Ni/$Al_2O_3$ catalyst indicated the existence of both amorphous and graphitic carbon. Therefore, the $ZrO_2$ ALD overcoating suppressed the formation of problematic graphitic carbon, which is again a desirable result. 5 cycles of $ZrO_2$ ALD film decreased 76% relative coke and 10 cycles of $ZrO_2$ ALD decreased 90% relative coke compared to Ni/$Al_2O_3$ after DRM at 800° C. for 48 h and at 700° C. for 48 h sequentially. Similar results were obtained from the TPO result (FIG. 9B) of the spent catalysts after the 100-h DRM reaction at 600° C. Due to the lower oxidation capacity for $CO_2$ at lower temperatures, the carbon deposition at 600° C. was more severe than after the sequential DRM reactions at 800° C. and 700° C. Severe coke after 100-h DRM test at 600° C. was found for unmodified Ni/$Al_2O_3$, reaching ~39.9 wt. % of Ni/$Al_2O_3$; in contrast, the coke was only 11.8 wt. % of the 10$ZrO_2$-Ni/$Al_2O_3$ catalyst using the same DRM reaction conditions, indicating that the $ZrO_2$ layer resulted in a tremendous decrease of approximately 71% carbon deposition compared to unmodified Ni/$Al_2O_3$. Only the spent Ni/$Al_2O_3$ showed a prominent peak above 700° C., which indicates $ZrO_2$ overcoating effectively suppressed the formation of problematic graphitic carbon (FIG. 9B).

Moving forward towards developing coke-resistant catalyst for AN synthesis by hydrocyanation of acetylene in excess hydrogen ambient, the data clearly demonstrate the powerful tools available to modify the catalysts. It is desirable to develop a highly active and highly stable catalyst at relatively low operating temperature. Highly dispersed metal nanoparticles can be prepared by ALD. On the other hand, low reaction temperature thermodynamically favors the pathway to deposit coke. For AN synthesis at 450 to 700° C., it is possible to reduce the coke formation by applying $CeO_2$ or $ZrO_2$ overcoating with precisely controlled film thickness by ALD.

Example 3. Nonequilibrium Plasma Synthesis of Acrylonitrile from Methane and Nitrogen This Example describes a plasma-catalytic synthesis of hydrogen and acrylonitrile (AN) from $CH_4$ and $N_2$. The process involves two steps: 1) plasma synthesis of $C_2H_2$ and HCN in a nominally 1:1 stoichiometric ratio with high yield up to 90% and 2) downstream thermocatalytic reaction of these intermediates to make AN. The effect of process parameters on product distributions and specific energy requirements are reported. If the catalytic conversion of $C_2H_2$ and HCN in the downstream thermocatalytic step to AN were perfect, which will require further improvements in the thermocatalytic reactor, then at the maximum output of a 1 kW radiofrequency 13.56 MHz transformer, a specific energy requirement of 73 kWh kgAN-1 was determined. The expectation is that scaling up the process to higher throughputs would result in decreases in specific energy requirement into the predicted economically viable range less than 10 kWh kgAN-1.

Methane is an abundant natural resource. CH4 typically comprises 75 to 90 mol. % of fossil natural gas. It can also be produced anaerobically by decomposition of biomass to sustain the metabolic functions of organisms, wherein the product biogas is comprised of approximately 50 to 75 mol. % CH4 with the majority of the balance gas being CO2. One of the principle technological uses of CH4 is the production of hydrogen by steam reforming, which directly produces CO2 in the water-gas shift step, and also indirectly produces CO2 as a result of heat production for the endothermic syngas synthesis step. Thus hydrogen production by methane steam reforming is generally not considered sustainable unless it is combined with carbon dioxide capture and storage.

Given electricity produced from renewable energy or nuclear energy, dehydrogenation of methane is much less energy intensive for producing hydrogen than water splitting. If the endothermic reaction is driven by electricity produced from wind power, for example, then the only CO2 intrinsically emitted by methane dehydrogenation is produced from the primary source; for example, CO2 impurities removed from raw natural gas. Quantitatively, producing hydrogen by complete dehydrogenation of methane is ideally six times less energy intensive than water splitting (Table 1). At the commercial scale, this gap remains, with water electrolysis requiring approximately 55 kWh kg-1 of hydrogen; and recent reports on carbon black production at a scale of 10,000 tons per year 5 from natural gas using thermal plasmas requiring as low as 12 kWh kg-1 of hydrogen produced. The challenge is that the market for carbon black is approximately 10 million tons per year, which is about three orders of magnitude smaller than the amount of carbon that would be produced if the hydrogen economy were driven by dehydrogenation of methane. In general, the challenge with producing hydrogen by dehydrogenation of methane is identifying something useful to do with the carbon other than discarding it as waste.

Structural materials, specifically concrete and steel, are currently produced at a scale of billions of tons per year. Since the structural material market may be large enough, the general focus is on structural materials produced from carbonaceous byproducts of methane dehydrogenation with the idea that these materials may eventually replace concrete and steel in some applications. The vision is that these carbonaceous structural materials produced by methane dehydrogenation in the future are expected to resemble robust polymeric composites that are used today for advanced applications in aerospace, for example carbon fiber reinforced polyaryletherketones. These materials are also attractive for automotive applications, and the co-production of hydrogen could potentially lower production cost to make that application more economically viable.

The conventional process for synthesizing carbon fiber involves oxidizing and then graphitizing polyacrylonitrile fibers. Polyacrylonitrile is produced by polymerization of acrylonitrile. While it is a reaction that has only been discussed a few times in the public literature, highly exothermic synthesis of acrylonitrile can be accomplished by an addition of acetylene to hydrogen cyanide. The production of acetylene and hydrogen cyanide from methane and nitrogen results is less hydrogen than complete dehydrogenation to carbon black. However, it is still possible to produce hydrogen by this reaction using less electricity than water splitting. Thus, there is a potential advantage from the perspective of electricity utilization for hydrogen production when compared to water splitting, and furthermore, the carbonaceous byproduct is more valuable than oxygen as a byproduct. The synthesis of acrylonitrile therefore seems attractive as a first demonstration of the production, by methane dehydrogenation, of a relevant carbonaceous material for structural applications. Furthermore, if the process is driven by renewable or nuclear electricity, then the reaction is expected to lower the CO2 emissions required to produce acrylonitrile when compared to the industrial state-of-the-art Standard Oil of Ohio (SOHIO) process, which is relatively CO2 intensive since it consumes hydrogen in the form of ammonia produced by the Haber-Bosch process.

In this Example, demonstrated is a process concept for the plasma-catalytic synthesis of a carbonaceous material of relevance for structural applications, specifically acrylonitrile (AN, CH2CHCN), by the dehydrogenation of methane. The process involves two steps. In the first step, acetylene (C2H2) and hydrogen cyanide (HCN) intermediates are synthesized by the reaction of methane (CH4) and nitrogen gas (N2) in a nonequilibrium plasma. Nonequilibrium plasma, in principle, can be less energy intensive when compared to thermal plasma as a medium for this reaction, due to the background gas temperature being lower. In the second step, the C2H2 and HCN intermediates react thermocatalytically to synthesize AN using a ZnO catalyst. The major impurity produced by this reaction is benzene when the gas fed to the thermocatalytic reactor is rich in acetylene, and the major impurity is propanenitrile when the gas fed to the thermocatalytic reactor is near the stoichiometric ratio of 1:1 C2H2:HCN. In both cases AN is a major product from the thermocatalytic reactor, thus proving the process concept. Focusing on the plasma reactor, adjusting 1) the reaction pressure, and 2) the hydrogen content of the nitrogen balance gas, are found to be effective means to tune the C2H2:HCN ratio of the intermediate product gas that elutes from the plasma. It is found that the specific energy requirement for the plasma, which is the power input divided by the ideal AN production rate, decreases with increasing feed rate at constant specific energy input. In other words, the reaction becomes more energy efficient as the throughput increases. At the maximum output of the radiofrequency (RF) power supply, which is 1 kW, an ideal AN specific energy requirement is measured at 73 kWh kgAN-1. A preliminary techno-economic assessment is presented that places this number in context of the SOHIO process and outlines future performance metrics at which the process presented herein is expected to be economically viable.

Figure 16:
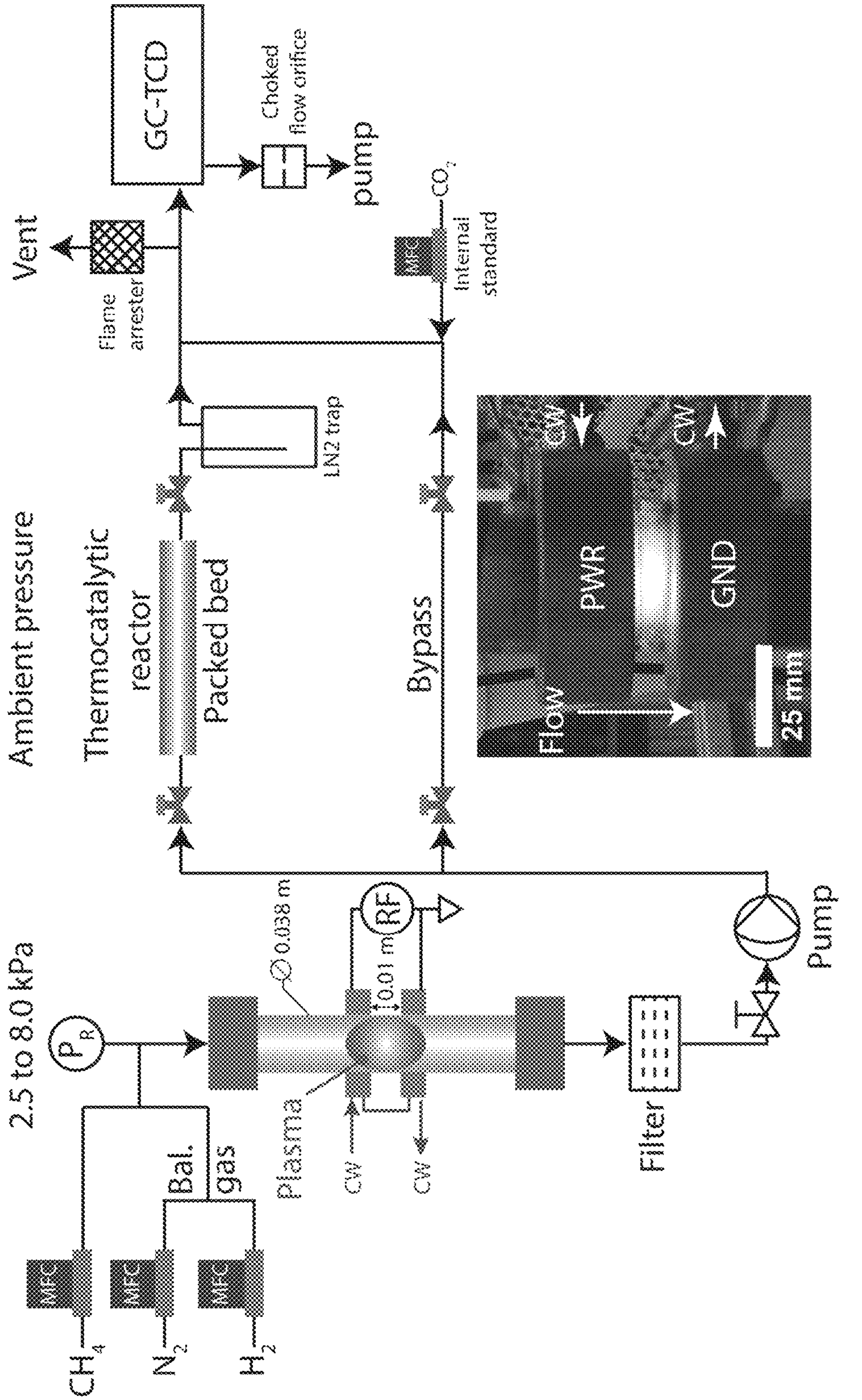
FIG. 16 depicts a schematic of a plasma-catalytic experimental apparatus in accordance with the present disclosure. The inset is a digital image of the plasma during operation in accordance with the present disclosure. To measure the intermediate chemical composition after the plasma, the flow was sent through the bypass after the pump. Abbreviations: powered (PWR) and ground (GND) electrodes, flow direction and cooling water ports are labeled. Mass flow controller (MFC), balance (bal.), cooling water (CW), radiofrequency power supply 13.56 MHz (RF), liquid nitrogen (LN2), and gas chromatograph with thermal conductivity detector (GC-TCD).

The bench-scale experimental apparatus can be understood through the simplified process flow diagram presented in FIG. 16. The reactor consists of two fluid systems. The plasma reactor fluid system operates at a reduced pressure in the range from 2.5 to 8.0 kPa; and the thermocatalytic reactor and gas analysis system operate near ambient pressure. A dry, chemical duty diaphragm pump was used to compress the flow from the pressure in the plasma reactor up to the pressure in the thermocatalytic reactor.

The plasma reactor consisted of a gas feeding system, reaction zone, and particle filter (FIG. 16). The feed gases (CH4, N2, H2) were controlled and measured by mass flow controllers. For all experiments, unless otherwise stated, the mole fraction of CH4 in the feed gas mixture was 19%. The balance gas, comprising the remaining 81 mol. % of the feed to the plasma, contained only N2 and H2, with a variable composition depending on the experiment. The discharge tube was fused silica and had an outer diameter of 0.038 m and inner diameter of 0.032 m. The plasma electrodes were brass rings that had a nominal inner diameter of 0.038 m, an outer diameter of 0.063 m, and a length of 0.023 m. The gap between the powered and grounded electrode was 0.01 m in all experiments. The electrodes were hollow and cooling water was used to prevent overheating, which becomes an issue in air-cooled configurations at applied powers greater than a few hundred Watts. The 13.56 MHz RF power supply had a maximum output of 1,000 W. Specific energy inputs and specific energy requirements were calculated using the indicated forward power on the power supply. An automatic tuning network was used for impedance matching. Particle filters consisting of stainless-steel mesh affixed to KF centering rings were used to remove particulate byproducts formed during methane dehydrogenation. Under all conditions explored in this disclosure, carbonaceous aerosol formation was found to be significant, even though the particulates that were produced comprised only a few percent of the carbon that was fed to the plasma reactor. A throttle valve upstream of the diaphragm pump was used to control the pressure. The particle filters are necessary to ameliorate fouling and eventual clogging of the throttle valve, as well as fouling of the pump, which reduces pumping speed. Periodic cleaning of the pump and throttle valve is necessary. Furthermore, over long-term operation, up to an hour, carbon deposits between the RF electrodes will eventually cause a short circuit. To prevent short circuits, it is necessary to periodically etch the carbon deposit using H2 plasma. Etches were typically done with 50% H2 balance N2.

On the ambient pressure side of the diaphragm pump there were two flow paths. One went through the thermocatalytic reactor and a liquid nitrogen trap. The other flow path went through a bypass. These two flow paths downstream were sent to vent through a flame arrester. Before reaching the vent, a small portion of the flow, always less than the total flow, was sampled and sent through a gas chromatograph for compositional analysis. A ShinCarbon column was used in combination with a thermal conductivity detector (TCD). The gas chromatograph (GC) sample flow was extracted through a choked flow orifice using a vacuum pump. Over time, small clogs in the GC sample port caused the pressure in the sample loop to drop, which made all peak areas decrease but the relative peak areas stayed the same. Thus, quantification was performed by measuring peak areas relative to a known flow of an internal standard. The internal standard was CO2, which produced a peak in the chromatogram that was well-separated from all the product peaks of interest. The intermediate product gas mixture that eluted from the plasma was characterized by passing the flow through the bypass before GC sampling (FIG. 16). The final product mixture was characterized by passing the intermediate gas mixture through the catalyst bed (FIG. 16). Conversion of C2H2 and HCN were characterized by measuring the composition of the gas eluting from the thermocatalytic reactor using the online GC with the vapor trap at ambient temperature. The condensable vapor mixture was characterized by cooling the trap to liquid nitrogen temperatures and then analyzing the carbonaceous liquid found in the trap after warming up to ambient temperature. The carbonaceous organic liquid condensed in the trap was characterized offline using gas-chromatography mass-spectroscopy (GC-MS) using a procedure described below.

Most of the data presented in this disclosure was from measurements of the intermediate chemical composition after the plasma, and calculations performed using that data. To measure the intermediate chemical composition after the plasma, the flow was sent through the bypass after the diaphragm pump and measured by online GC-TCD (FIG. 16). Only CH4, C2H6, C2H4 and C2H2 and HCN were measured by GC-TCD. All other carbonaceous species, including carbon lost to the reactor walls and particulates, were accounted for as "carbon balance" by performing a carbon balance using the CH4 feed and all of the measured species flow rates in the effluent. The maximum amount of carbon lost to the walls can be taken as this carbon balance number, although that is an overestimate. In all cases the carbon balance was less than 10% of the carbon fed to the plasma, meaning greater than 90% of the carbon in the intermediate mixture after the plasma was accounted for as CH4, C2H6, C2H4, C2H2 or HCN.

In select experiments, the results of which are summarized in the below table, the intermediate gas mixture produced by the plasma was sent through the thermocatalytic reactor. The catalytic reaction temperature was 773 K and the pressure was near ambient. All species concentrations have been normalized to the concentration of AN. The GC-TCD is not sensitive enough to clearly resolve impurities, and thus the product vapor was condensed in the liquid nitrogen trap to perform offline GC-MS on the collected hydrocarbon liquid. Before cooling down the liquid nitrogen trap to condense the vapor, the conversion of C2H2 and HCN in the thermocatalytic reactor was measured by GC-TCD. Then the trap was cooled down to collect product. The liquid nitrogen trap was not optimized and thus did not collect all of the vapor, thus a quantitative carbon balance could not be performed using the GC-MS measurements. The impurities in the collected liquid can only be described relative to acrylonitrile.

| | | Plasma effluent composition | |
|---|---|---|---|
| Compound | Structure | $2.5\ C_2H_2 + HCN$ | $1.05\ C_2H_2 + HCN$ |
| | | Amount relative to AN (molar basis) | |
| Acrylonitrile (AN) | | 1.0 | 1.0 |
| Benzene |  | 1.13 | 0.069 |
| Propanenitrile | 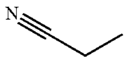 | — | 1.70 |

-continued

| Compound | Structure | Plasma effluent composition: 2.5 $C_2H_2$ + HCN | Plasma effluent composition: 1.05 $C_2H_2$ + HCN |
|---|---|---|---|
| | | Amount relative to AN (molar basis) | |
| Butanedinitrile | 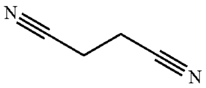 | — | 1.34 |
| Acetonitrile |  | 0.12 | 0.21 |
| $C_2H_2$ consumed in catalytic reactor: | | 100% | 100% |
| HCN consumed in catalytic reactor: | | 100% | 83.6% |
| Mass-normalized space velocity in catalytic reactor | | 0.72 $s^{-1}$ $g_{Zn}^{-1}$ | 0.77 $s^{-1}$ $g_{Zn}^{-1}$ |

Figure 22A:
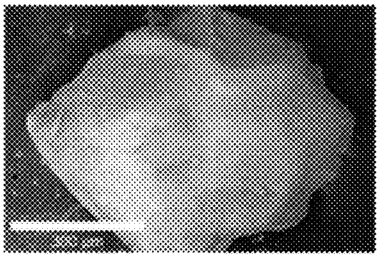
FIG. 22A depicts a secondary electron image of a catalyst particle measured in a scanning electron microscope in accordance with the present disclosure.
Figure 22B:
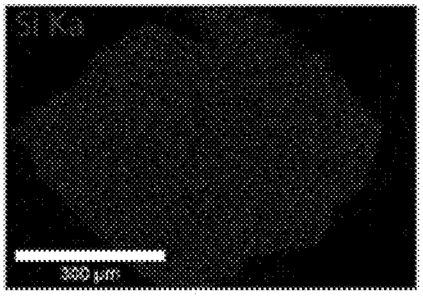
FIG. 22B depicts an energy dispersive x-ray map of emission from Si Ka in the catalyst particle in accordance with the present disclosure.
Figure 22C:
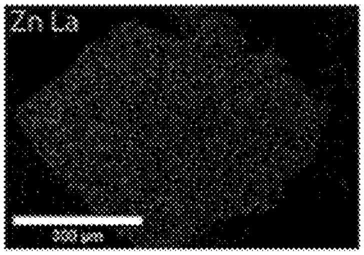
FIG. 22C depicts an energy dispersive x-ray map of emission from Zn La in the catalyst particle, with lines showing uniform Zn distribution in the catalyst particle at the 10 μm length, in accordance with the present disclosure.
Figure 22D:
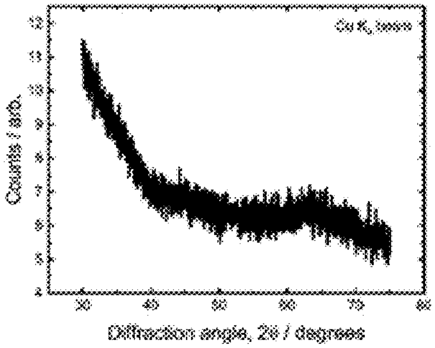
FIG. 22D depicts an X-ray diffraction pattern of the catalyst material showing no peaks in the angular domain where ZnO peaks are expected in accordance with the present disclosure.

The ZnO catalyst used in this disclosure was based on a previous report that basic metal oxides are promising for the synthesis of AN from $C_2H_2$ and HCN. The catalyst was 10 wt. % ZnO supported on a high surface area silica gel prepared by wet impregnation. The silica gel support was 35-60 mesh davosil grade 636 with a manufacturer reported pore size of 6×10-9 m and specific surface area of 480×103 m2 kg-1 measured by nitrogen adsorption using the Brunauer-Emmet-Teller (BET) technique. An amount of 22.2×10−3 kg of catalyst was prepared by the following procedure. To 50 moles of deionized water was added 8.12×10−3 kg of zinc nitrate hexahydrate. The salt was allowed to fully dissolve, and then 20×10−3 kg of silica gel was added to the solution and mixed thoroughly. The liquid water was then evaporated off. The resulting wet powder was then allowed to completely dry in the fume hood, which took approximately 16 hours, thereby yielding zinc nitrate salt deposited on the silica gel support. This material was then packed into a 0.150 m length of 1.53×10−2 m inner diameter stainless steel tubing with stainless steel mesh at both ends to retain the catalyst material in the center. The tubing had Swagelok fittings on both ends. Bellows-sealed high temperature valves were placed on both ends of the length of tubing and the entire tube with catalyst inside was tightly closed. The tubing was wrapped with heating tape and a thermocouple was used to monitor temperature during calcination. The material was calcined at 773 K under flowing air for 5 hours to form the ZnO catalyst. A caustic NaOH scrubber was used to remove and neutralize acidic nitrogen oxide gases given off during calcination. After calcination, the valves were closed to prevent exposure of the catalyst to the ambient environment and the length of tubing, including valves and heating tape, were mounted to the plasma-catalysis system. Thereby the tube that was used to prepare the catalyst became the thermocatalytic reactor in the plasma-catalysis system. The fresh catalyst was not exposed to the ambient atmosphere. In a select experiment, some catalyst was removed for material characterization. Elemental mapping by energy-dispersive spectroscopy in a Thermofisher Quattro S scanning electron microscope equipped with an Oxford Aztec energy-dispersive x-ray spectrometer revealed that the Zn was uniformly distributed within catalyst particles at a length scale of 10−5 to 10−4 m (FIGS. 22A to 22C). X-ray diffraction in a Bruker d8 Advance x-ray diffractometer showed that the material was amorphous, which indicates either the ZnO was amorphous or that an amorphous zinc silicate glass had formed (FIG. 22D). After calcination, the as-prepared catalyst had a 15% smaller specific surface area of 406×103 m2 kg-1 when compared to the initial silica gel support (480×103 m2 kg-1).

Experiments focused on the production of liquid mixtures containing AN for offline GC-MS characterization were carried out using 22.2×10-3 kg of 10 wt. % ZnO catalyst. For all experiments, the temperature of the catalyst bed was 773 K during reaction. The mass normalized space velocity in the catalyst bed was between 0.7 and 0.8 s-1 gZn-1. The effluent from the thermocatalytic reactor passed through the liquid nitrogen trap to collect condensable vapors. The GC-MS protocol to analyze AN-containing reactor liquid samples utilized an Agilent 7890A GC equipped with a dual detection using an Agilent 5975C MS system with a triple-axis detector and a flame ionization detector (FID). A Polyarc® microreactor was installed upstream of the FID detector which enabled quantification via a single internal standard. Therefore, 100 μL of AN-containing sample was spiked with 1 μL decane standard. The Polyarc converts all carbon to methane so moles of a species in the sample is proportional to the GC peak area divided by the number of carbons in the compound. GC analysis was performed using a Restek fused silica RTX-50 capillary column (crossbond phenyl methyl polysiloxane, ID: 0.25 mm, film thickness: 0.5 μm, and length: 30 m). The inlet temperature was set at 250° C. with a split ratio of 100:1, and the helium was held at 26 mL/min. 0.2 μL of AN-containing sample was injected every run. The column temperature was held at 40° C. for 2 minutes and then heated to 315° C. and held at that temperature for 55 minutes. The MS detector was held at 285° C. and no solvent delay was applied. The MS spectra were identified by using the system database while external standards were used to verify peak assignment of compounds of interest.

In select experiments, plasma diagnostics were carried out to further characterize the reaction environment. The voltage applied to the powered electrode was measured with respect to the grounded electrode by means of a 1000× high voltage probe connected to an oscilloscope. The background gas temperature was characterized by inserting a fluorescence decay temperature probe with an operational range from 473 to 1223 K into the plasma. The temperature probe was positioned just downstream of the powered electrode in the discharge gap.

Figure 17:
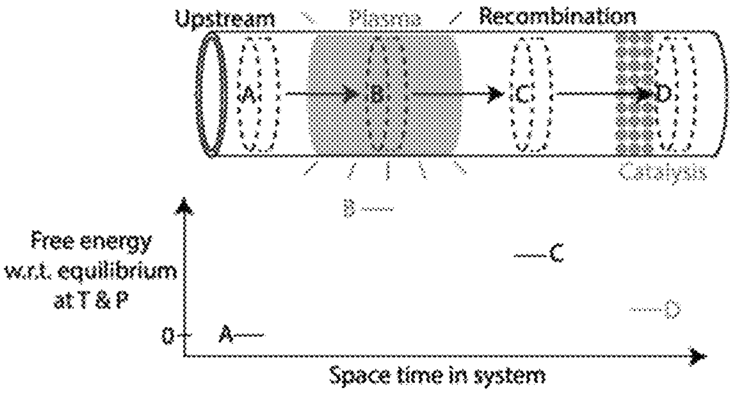
FIG. 17 depicts a plasma-catalysis concept in accordance with the present disclosure. The feed gas is state A. The chemical state that is only stable in the plasma is B. The intermediate chemically metastable products observed from the plasma reaction is state C. The final product of the process after thermocatalytic relaxation is state D. Abbreviation: with respect to (w.r.t.).

The basic idea behind the present approach to plasma-catalysis involves activating the gas in the plasma, followed by downstream catalytic relaxation towards equilibrium to synthesize the desired products. The concept is illustrated in FIG. 17. Consider a feed gas composition that is 19 mol. % CH4 and 81 mol. % N2. At the feed conditions, this gas is nominally in the equilibrium state at ambient temperature and the reactor pressure. Based on previous results in other chemical systems, in the discharge, the gas gets activated and eventually at long residence times reaches a stationary speciation that is stable only in the nonequilibrium plasma. As soon as the gas leaves the plasma, the time evolution is governed by the equilibrium state at the local temperature and pressure, and the chemical composition that was previously stable in the plasma becomes unstable and relaxes to a metastable state through a process termed recombination. This metastable product of the recombination process can then be observed by gas analysis equipment such as gas chromatographs.

It has become apparent recently that nonequilibrium plasmas produce metastable chemical configurations that are shifted in the endothermic direction with respect to equilibrium at the pressure and background gas temperature in the nonequilibrium plasma. These intermediate chemically metastable products of the endothermic plasma reaction can have very high enthalpy of formation, for example C2H2 and HCN. As such, the intermediate products are thermodynamically unstable at low temperatures and can be made to react exothermically by downstream thermal catalysis. By controlling the catalytic reaction using well-known approaches of thermal catalysis, desired final products can be produced. This approach allows independent optimization of the plasma reaction and thermal catalytic reaction. The plasma can be optimized to produce the desired intermediates with minimized specific energy requirement, desired stoichiometry, and yield of carbon. The thermocatalytic reaction can then be separately optimized using the catalyst material, amount of catalyst, temperature, etc. to maximize overall reaction objectives such as yield of final product (e.g. AN).

In this disclosure, the focus is primarily on the nonequilibrium plasma step with the goal of synthesizing C2H2+HCN intermediate products in equimolar ratio from methane and nitrogen feedstock. In other words, this disclosure focuses on state C in FIG. 17. However, also presented is a preliminary proof-of-concept for the overall process where the effluent from the plasma was directly passed through the thermocatalytic reactor and synthesis of final AN product was demonstrated. From these preliminary experiments, some first observations are made of the relationship of the C2H2 and HCN stoichiometric ratio to the impurities present in the synthesized AN.

Some calculations must be made to understand the performance of the process.

1) Specific energy input is the power read from the power supply divided by the total influent molar flow rate to the plasma.
2) Throughput is the amount of mass and the amount of energy that is passed through the system per unit time while keeping the specific energy input constant. In other words, increasing throughput means increasing power and total feed rate proportionally while keeping everything else constant.
3) The yield of C2H2+HCN is the fraction of carbon that has been converted into C2H2+HCN with 1:1 molar ratio. Yield accounts for conversion of CH4, unwanted byproducts, as well as overproduction of intermediates (e.g. overproduction of C2H2 relative to HCN or vice versa). The yield of the plasma reaction as the fraction of carbon that ends up as C2H2 and HCN after the plasma in a stoichiometric mixture is the same as the fraction of carbon that would end up as AN given a perfect downstream catalytic process. It can be calculated from the measured molar flow rates of acetylene and hydrogen cyanide in the plasma effluent, and the molar flow rate of methane in the influent:

$$\text{Yield} = \frac{3 \cdot \min\left(n^{out}_{C_2H_2}, N^{out}_{HCN}\right)}{n^{in}_{CH_4}}, \tag{1}$$

Where $n_i^{in/out}$ is the molar flow rate of species i into or out of the plasma. The function min(x,y) returns the smaller of the two values x and y. In other words, min ($n_{C_2H_2}{}^{out}$, $n_{HCN}{}^{out}$) returns the molar flow rate of the limiting intermediate ($C_2H_2$ or HCN), and thus it returns the stoichiometric maximum possible molar production rate of AN. The 3 in equation (1) comes from the number of carbon atoms in AN.

4) The ideal AN production rate is what the production rate of AN would be if the downstream thermocatalytic reaction were to have 100% yield of AN from C2H2 and HCN.
5) The ideal specific energy requirement of AN synthesis assumes a perfect downstream catalytic reaction and is thus determined by the limiting reagent in the $C_2H_2$+HCN mixture:

$$SER^{IDEAL}_{AN} = \frac{W_{in}}{M^{AN}_{W} \min\left(n^{out}_{C_2H_2}, N^{out}_{HCN}\right)}, \tag{2}$$

where $W_{in}$ is the forward power read from the RF power supply and $M_W{}^{AN}$ is the molecular weight of acrylonitrile, which is 0.053 kg $mol^{-1}$.

The yield from the plasma of acetylene and hydrogen cyanide increases with throughput at constant specific energy input. For an inflow composition of 19% $CH_4$ balance $N_2$, the yield of $C_2H_2$+HCN is plotted as a function of total influent molar flow rate to the plasma for several different specific energy inputs in FIG. 18B. The high flow limit in the plots was determined by the maximum output of the power supply (1,000 W). The error bars were determined by repeat experiments at nominally the same conditions. The standard deviation of the measurements was approximately ±10% of the value. Since the yield of C2H2+HCN increases with throughput at constant specific energy input (FIG. 18B), the ideal specific energy requirement of AN synthesis decreases with increasing throughput (FIG. 18C).

Figure 18A:
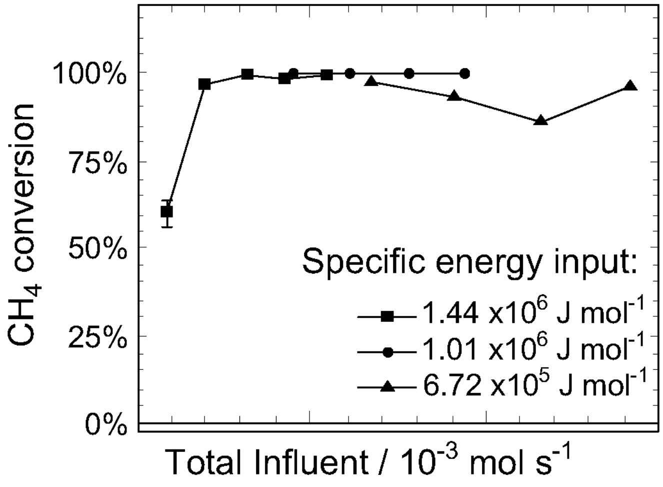
FIG. 18A depicts a $CH_4$ conversion per total influent flow for an AN synthesis in accordance with the present disclosure. Increasing throughput at constant specific energy input increases yield and decreases specific energy requirement of AN synthesis. This figure was made from calculations performed using the measured intermediate chemical composition after the plasma. All experiments were conducted using 19 mol % $CH_4$ balance $N_2$ influent at a pressure of 5.3 kPa. Yield was calculated using Equation (1) and specific energy requirement using Equation (2). The specific energy input was held constant at (yellow) $1.44\times10^6$ J $mol^{-1}$, (gray) $1.01\times10^6$ J $mol^{-1}$, or (blue) $6.72\times10^5$ J $mol^{-1}$ as total influent flow was increased, meaning power increased with flow by that constant of proportionality.
Figure 18B:
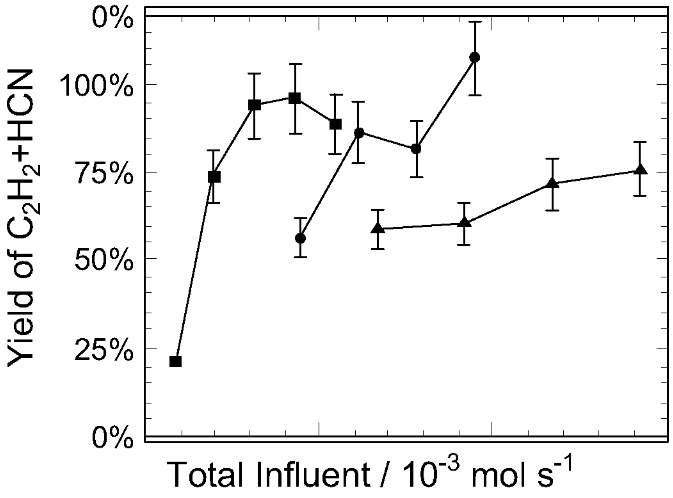
FIG. 18B depicts a yield of $C_2H_2$+HCN per total influent flow for an AN synthesis in accordance with the present disclosure. Increasing throughput at constant specific energy input increases yield and decreases specific energy requirement of AN synthesis. This figure was made from calculations performed using the measured intermediate chemical composition after the plasma. All experiments were conducted using 19 mol % $CH_4$ balance $N_2$ influent at a pressure of 5.3 kPa. Yield was calculated using Equation (1) and specific energy requirement using Equation (2). The specific energy input was held constant at (yellow) $1.44\times10^6$ J $mol^{-1}$, (gray) $1.01\times10^6$ J $mol^{-1}$, or (blue) $6.72\times10^5$ J $mol^{-1}$ as total influent flow was increased, meaning power increased with flow by that constant of proportionality.
Figure 18C:
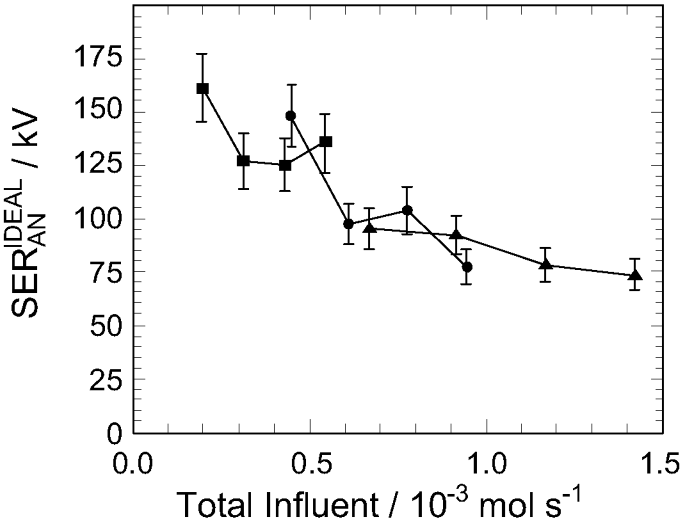
FIG. 18C depicts a $SER^{IDEAL}_{AN}$/kWH $kg^{-1}$ per total influent flow for an AN synthesis in accordance with the present disclosure. Increasing throughput at constant specific energy input increases yield and decreases specific energy requirement of AN synthesis. This figure was made from calculations performed using the measured intermediate chemical composition after the plasma. All experiments were conducted using 19 mol % $CH_4$ balance $N_2$ influent at a pressure of 5.3 kPa. Yield was calculated using Equation (1) and specific energy requirement using Equation (2). The specific energy input was held constant at (yellow) $1.44\times10^6$ J $mol^{-1}$, (gray) $1.01\times10^6$ J $mol^{-1}$, or (blue) $6.72\times10^5$ J $mol^{-1}$ as total influent flow was increased, meaning power increased with flow by that constant of proportionality.

The results in FIGS. 18A-18C demonstrate that the energy efficiency of the process can be tuned by changing the power supplied to the plasma and the total influent flow rate. Importantly, the data in FIGS. 18A-18C shows that the reaction becomes more energy efficient when the throughput increases. Reactors with higher production rates are expected to have lower specific energy requirement for producing AN. Interestingly, the results in FIG. 18 are already competitive with the few results that have been reported for thermal plasmas for this reaction. The comparison to thermal plasma is encouraging in that nonequilibrium plasmas, which have a lower background gas temperature compared to thermal plasmas and therefore require less bulk gas heating and can offer faster quenching, may ultimately be more energy efficient.

Currently, the underlying cause of the trend with throughput is not definitively explained. Without being bound to any particular theory, the following hypothesis, consistent with the evidence, is considered. In general, the electron temperature—which is ⅔ of the mean kinetic energy divided by the Boltzmann constant—can be and important parameter in determining the chemistry in nonequilibrium plasmas. The excitation through electron impact of various reactive primary species depends on the kinetic energy of the impacting electron, and therefore depends on the electron energy distribution function and electron temperature. For example, the probability of an electron collision with N2 producing an electronically excited state, instead of a vibrationally excited state, increases with electron kinetic energy. Thus, as the electron temperature increases, meaning the electron energy distribution function shifts towards higher energies, a collision of an electron with an N2 molecule has a higher probability of producing an electronically excited state. This expectation is important because electronically excited states of N2 are believed to be a reservoir of chemical reactivity in nonequilibrium plasmas.

The reduced electric field (E/N) used to generate the plasma, which is the electrical field (E) divided by the gas density (N), plays an important role in determining the electron temperature. The reduced electric field can be thought of as the energy that an electron picks up between collisions with gas molecules. Thereby electron temperature increases with both applied electrical field and with decreasing gas density. For some ideal cases, the electron temperature is expected to be proportional to the reduced electrical field, but in general, if the frequency of collisions between electrons and the background gas is greater than the frequency of the external driving voltage, which is true of the experiments in this disclosure, then it is expected that the electron temperature will increase with E/N. With higher reduced electric field, power is coupled into the plasma at a higher electron temperature. Thus, by changing E/N, to some extent the chemical reactions in the plasma can be controlled through preferential excitation of certain molecular states over others.

Figure 19A:
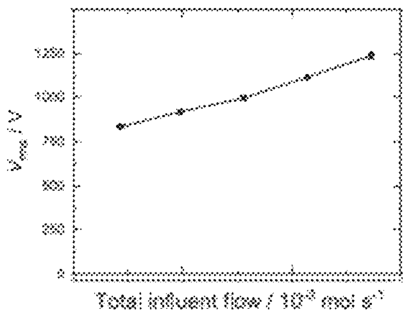
FIG. 19A depicts a root-mean-square voltage difference measured between the powered and ground electrodes as a function of total influent flow in accordance with the present disclosure. Applied electric field increases with throughput, caused by increased power with increased total influent flow required to keep the specific energy input constant. The total pressure in this experiment was 5.3 kPa, and the influent composition was 19% $CH_4$ balance $N_2$. The specific energy input was $1.44\times10^6$ J $mol^{-1}$ and the electrode gap was 0.01 m.
Figure 19B:
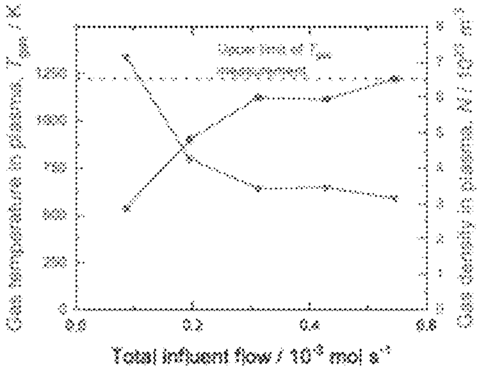
FIG. 19B depicts a background gas temperature (squares) and corresponding background gas density (triangles) as a function of total influent flow in accordance with the present disclosure. Gas temperature increases with throughput, caused by increased power with increased total influent flow required to keep the specific energy input constant. The total pressure in this experiment was 5.3 kPa, and the influent composition was 19% $CH_4$ balance $N_2$. The specific energy input was $1.44\times10^6$ J $mol^{-1}$ and the electrode gap was 0.01 m.
Figure 20:
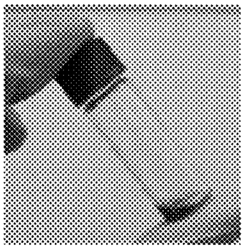
FIG. 20 depicts a photograph of a small amount of a product liquid in a vial, which was collected in a trap after a thermocatalytic reactor for two different ratios of $C_2H_2$ to HCN for the intermediate gas chemical composition produced by the plasma in accordance with the present disclosure. The catalytic reaction temperature was 773 K and the pressure was near ambient.

In the present experiments, the reduced electrical field increased significantly with throughput, an effect that was caused by increased applied power with increasing feed to the plasma to keep the specific energy input constant. This result can be understood intuitively since a higher electrical field is required to drive more electrical energy through the plasma. Furthermore, with increasing power applied to the plasma, the background gas temperature is expected to increase, which would decrease the background gas density. Measurements were made of the root-mean-square (RMS) voltage applied to the powered electrode with respect to the ground electrode; and the background gas temperature, as a function of throughput at a constant specific energy input of 1.44×106 J mol-1. The results are plotted in FIGS. 19A-19B. As applied power increased with total influent flow to keep the specific energy input constant, the applied RMS voltage increased (FIG. 19A) and the background gas temperature also increased (FIG. 19B). Therefore, the reduced electrical field, E/N, is expected to have increased with increasing throughput. Accurate determination of E/N can be complex, but nominal calculations performed by dividing the RMS voltage by the gap spacing and gas density produced values in the range from 100 to 400 Townsend (Td). The hypothesis is that higher energy plasma species, such as metastable electronically excited states of N2, are key in the reaction mechanism that forms HCN and C2H2 in this nonequilibrium plasma, and thereby the reaction becomes more energy efficient at higher throughputs because the energy is coupled into the plasma at a higher electron temperature.

It is instructive to break out in detail the results for the condition that currently produces the lowest specific energy requirement. That data will provide context for the development of parameters to tune the output from the plasma reaction. The detailed plasma operational conditions, as well as inputs and outputs for the most energy efficient case thus far measured are presented in the below table. Examination of the data in the below table reveals that the methane conversion was very high, 96% of the carbon fed into the reactor as methane was converted into other species. Nearly all this carbon was converted to acetylene and hydrogen cyanide, with less than 1% of other C2 species such as ethylene and ethane. The challenge is that acetylene and hydrogen cyanide were not in the stoichiometric ratio. More specifically, for an ideal 1:1 molar ratio of C2H2:HCN, there needs to be 2× more carbon in C2H2 compared to HCN. Inspection of the data in the below table reveals that the carbon in C2H2 was approximately 2.8× the carbon in HCN. In other words, there was too much acetylene in the product gas stream—the molar ratio C2H2:HCN was approximately 1.4:1. Complicating the situation, the C2H2:HCN ratio changes with throughput. For the data in FIGS. 18A-18C, the C2H2:HCN ratio varied from 1.8:1 (C2H2 rich) to 0.83:1 (HCN rich). In the future, as the process is tuned to minimize $SER_{AN}^{IDEAL}$ by increasing the throughput, methods are needed to adjust the effluent composition at a given throughput to bring it back to the stoichiometric ratio. For example, if the carbon present in the C2H2 and HCN for the case in the below table were redistributed such that the C2H2:HCN ratio were stoichiometric, then the $SER_{AN}^{IDEAL}$ would drop to 57 kWh $kgAN^{-1}$. Experimental parameters that allow the effluent composition to be tuned independently from throughput are discussed next.

| Inputs | | |
|---|---|---|
| Pressure | 5.3 | kPa |
| Background gas T | >1223 | K |
| RF Power | 953 | W |
| Total input flow rate | $1.42 \times 10^{-3}$ | mol $s^{-1}$ |
| $CH_4$ input mol fraction | 19 | % |
| $N_2$ input mol fraction | 81 | % |
| $H_2$ input mol fraction | 0 | % |
| **Outputs** | | |
| Yield $C_2H_2$ + HCN | 75.9 | % |
| $SER_{AN}^{IDEAL}$ | 73.1 | kWh $kg_{AN}^{-1}$ |
| Ideal AN production rate | 0.013 | $kg_{AN}$ $hr^{-1}$ |

Fraction of carbon in effluent from the plasma as:

| | |
|---|---|
| $CH_4$: | 4.4% |
| $C_2H_2$: | 71.8% |
| HCN: | 25.3% |
| $C_2H_4$: | 0.16% |
| $C_2H_6$: | 0.13% |
| Carbon balance: | −1.83% |

Figure 21A:
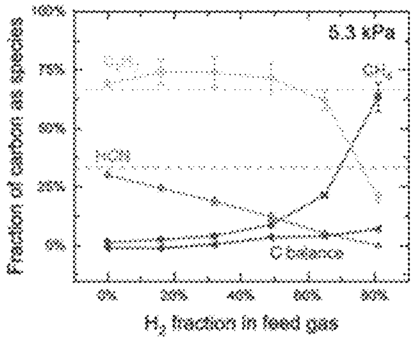
FIG. 21A depicts trends in the plasma effluent intermediate chemical composition with $H_2$ fraction in the plasma feed gas in accordance with the present disclosure. The total flow rate to the plasma was $3.12\times10^{-4}$ mol $s^{-1}$ and the RF power was 450 W. The $CH_4$ mol fraction in the feed was constant at 19%. $N_2$ made up the balance that was not $H_2$ or $CH_4$. The pressure was constant at 5.3 kPa. Ethane and ethylene have been omitted for clarity. The dashed lines indicate the expected fractions of carbon as $C_2H_2$ (top) and HCN (bottom) if the yield of $C_2H_2$+HCN were 100%.
Figure 21B:
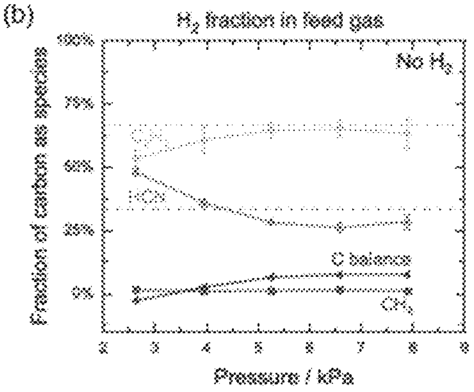
FIG. 21B depicts trends in the plasma effluent intermediate chemical composition with pressure in accordance with the present disclosure. The total flow rate to the plasma was $3.12\times10^{-4}$ mol $s^{-1}$ and the RF power was 450 W. The $CH_4$ mol fraction in the feed was constant at 19% for both panels. The feed gas composition was constant at 19% $CH_4$ and 81% $N_2$. Ethane and ethylene have been omitted for clarity. The dashed lines indicate the expected fractions of carbon as $C_2H_2$ (top) and HCN (bottom) if the yield of $C_2H_2$+HCN were 100%.

Reactor pressure and balance gas composition ($N_2$ and $H_2$) can be used to tune the composition of the plasma effluent. More specifically, HCN selectivity, expressed as the fraction of carbon in the effluent from the plasma, decreased with increasing H2 fraction in the balance gas and with increasing reactor pressure. Plotted in FIGS. 21A-21B are the results of experiments that were conducted at a constant total flow rate of 3.12×10−4 mol s-1 fed to the plasma, constant CH4 mol fraction of 19% in the influent, and a constant RF power input of 450 W. Ethane and ethylene were also measured but were very low and have been omitted for clarity. The carbon balance is the carbon that was not accounted for as species measured by GC-TCD, which can be thought of as particulate and tar deposition in the reactor. Plotted in FIG. 21A is the result of a triplicate of experiments conducted at a constant pressure of 5.3 kPa with different H2 mol fractions in the feed. The remainder of the feed gas was N2 that was not CH4 or H2. As the balance gas was changed from pure N2 to pure H2, the fraction of HCN in the effluent decreased. Thus, increasing mol fraction of N2 in the feed gas can be used to increase the selectivity for HCN. Similarly, if the feed gas composition was kept constant at 19% CH4 and 81% N2, then increasing the total pressure decreased the selectivity for HCN (FIG. 21B). Thus, by tuning the composition of the feed gas by adjusting the relative amounts of H2 and N2, and by tuning the reaction pressure, the composition of the effluent can be controlled.

Notably, the plasma step of this process operates under sub-ambient pressure. Operating a vacuum reactor has some disadvantages. For example, it requires passing the process gas through a pump, which increases capital expenditures, operating expenditures, and maintenance. However, for non-equilibrium plasma processes, the reaction kinetics can be orders of magnitude faster at low pressure even for similar specific energy input, which can compensate for higher volumetric flow rates at low pressure for a given molar flow rate. The result is that operating at reduced pressure can result in similar reactor volumetric productivity to operating at atmospheric pressure. Furthermore, if the chemistry is highly endothermic, such as the reaction discussed in this disclosure, then the power required by the chemistry is typically greater than the power required by the vacuum pump. For example, consider the synthesis of 1 mole of $C_2H_2$ and 1 mole of HCN from a feedstock that is 20% $CH_4$ balance $N_2$:

$$3CH_4+12N_2 \rightarrow C_2H_2+HCN+11.5N_2+4.5H_2. \quad (3)$$

The enthalpy change of this reaction at T=298 K is $\Delta H_{298}=5.78\times10^5$ J $mol^{-1}$ of reaction, as written. This enthalpy change is the minimum electricity required, and any inefficiencies will increase the energy input required by the chemical reaction. All the gases in the effluent, $C_2H_2$, HCN, $N_2$ and $H_2$ must be compressed after the plasma up to atmospheric pressure. The minimum work required to isothermally compress an ideal gas is:

$$W_{pump} - \eta RT \ln\left(\frac{P_2}{P_1}\right), \quad (4)$$

Where η is the number of mols of gas that must be compressed, which is 18 moles of gas for 1 mole of reaction (3) as written, R is the ideal gas constant, T is the temperature of the isothermal compression, $P_2$ is ambient pressure (100 kPa) and $P_1$ is the plasma reactor pressure (5 kPa). Assuming the gas is at 300 K, then approximately $1.34\times10^5$ J $mol^{-1}$ of reaction (3) is required to compress the gas. Pump efficiencies can be greater than 50%, thus the electricity required by the pump is expected to be in the range from 0.7 to 1.4 kWh $kg_{AN}^{-1}$. This pumping power requirement is much smaller than the specific energy requirements measured thus far (FIG. 18C). However, as the plasma reaction approaches its theoretical minimum value (3.1 kWh $kg_{AN}^{-1}$), the work required by the pump can become a significant fraction of the electrical load, but it is still expected to be less than the work required by the plasma. There are also strategies that could be employed involving turbines to reversibly expand the feedstock to the plasma reactor pressure to recover some work to drive the vacuum pump, for example by connecting the turbine to the pump using a rotating shaft.

To prove the concept in FIG. 16 of AN synthesis from $C_2H_2$+HCN intermediates, which in turn were synthesized from $CH_4$+$N_2$ in a plasma, several experiments, passing the effluent of the plasma reactor through a packed bed of catalyst after bringing the gas up to ambient pressure, have been performed. In all experiments reported herein, the catalyst bed was maintained at 773 K, which was found to provide the highest AN production rate in a quick screening of temperatures. Two different $C_2H_2$:HCN ratios were examined to see the effect on the byproducts in the liquid. In the first experiment acetylene rich conditions were used at $C_2H_2$:HCN=2.5:1; and in the second experiment nominally stoichiometric conditions were used at $C_2H_2$:HCN=1.05:1. In both cases, the conversion in the catalytic bed of $C_2H_2$ was 100%, and HCN was greater than 80%. AN was a major product, but there were byproducts.

The relative amount of acetylene to hydrogen cyanide had a significant effect on the impurities present in the liquid. For the $C_2H_2$-rich case, the only major impurity was benzene. In the nominally stoichiometric case, significant amounts of propanenitrile and butanedinitrile were detected with very little benzene. The result suggests that the catalytic yield of AN may be enhanced at conditions that are slightly $C_2H_2$-rich. The abundance of propanenitrile indicates that for stoichiometric mixtures it may be advantageous to remove hydrogen before thermocatalytic AN synthesis; or that hydrogen tolerant catalysts are needed. However, these results are preliminary, and a more thorough characterization of the catalyst is required before drawing strong conclusions. For example, the effects of thermocatalytic reaction temperature, space velocity, $C_2H_2$:HCN ratio, and catalyst material could be systematically studied since these are all parameters that are straightforward to control. Ultimately it would be helpful to understand the catalytic mechanism so reaction engineering and scale-up design work can be performed more systematically.

Moving to place this process concept in a broader context, the synthesis of AN from $CH_4$ and $N_2$ could produce value in several ways. First, it may be possible to produce AN from this route at a price that is competitive with the industrial state-of-the-art SOHIO process, which produces 90% of AN worldwide. The SOHIO process is based upon the ammoxidation of propylene to synthesize AN:

$$CH_2CHCH_3+NH_3+3/2O_2 \rightarrow CH_2CHCN+3H_2O. \quad (5)$$

The ammonia is produced by the Haber-Bosch process, which consumes hydrogen that is produced by stream reforming of hydrocarbons. The hydrocarbon steam reforming produces $CO_2$. Second, it may be possible to produce AN by the plasma-catalytic process with less $CO_2$ emission when compared to the SOHIO process, effectively decarbonizing AN. To assess the feasibility of economic viability and potential for AN decarbonization, some simple preliminary technoeconomic estimates have been performed.

The industrial state-of-the-art SOHIO process is the benchmark. The propylene used for the synthesis of AN by ammoxidation is produced by naphtha crackers. The process is energy and CO2 intensive, requiring approximately 2.8 kWh per kg of propylene, and emitting 1.0 kg $CO_2$e per kg of propylene. Moreover, the propylene, which costs approximately \$1.0 $kg^{-1}$, comprises 67% of the cost of producing AN by ammoxidation, resulting in a production cost of approximately \$1.5 per kg of acrylonitrile. The ammonia used by the SOHIO process is made by the Haber-Bosch process using hydrogen synthesized by methane steam reforming, which requires 9.4 kWh per kg of NH3, and emits approximately 1.5 kg CO2e per kg NH3. Considering small inefficiencies and waste in the process, 0.86 kg of propylene and 0.39 kg of ammonia are required to synthesize 1.0 kg of AN, resulting in the following process performance metrics for ammoxidation: 6.1 kWh per kgAN, 1.4 kg CO2e per kgAN, and a production cost of \$1.5 per kgAN. Recovery of heat at a high temperature is possible from the ammoxidation reaction because it is strongly exothermic, and estimates for the electricity and heat outputs have been made as 0.28 kWh and 0.91 kWh per kgAN respectively.

In performing technoeconomic and lifecycle estimates for the nonequilibrium plasma-catalytic process, some assumptions have been made to analyze what is believed to be the best-case feasible scenario based on the public literature. The electricity required by the plasma was taken as the main cost driver. Previous technoeconomic assessment of non-equilibrium plasma-chemical processes for similar endothermic reactions, operating at similar pressures, and with power supplies that have similar capital expenditure (CAPEX) requirements of approximately \$1 W-1, have found that the total CAPEX and operating expenditures (OPEX), in \$ kgproduct-1, are approximately twice the cost of electricity used by the process. TEA estimates were therefore made by finding the specific energy requirement (SER) in units of kWh kgAN-1, converting that SER to a \$elec kgAN-1 of electricity, and then the cost to produce 1 kg of AN was taken as twice the electricity cost plus the cost of CH4 and N2 inputs.

It is estimated, based on the public literature for plasma chemical processing, that the minimum specific energy requirement for the process illustrated in FIG. 16 is approximately 5.6 kWh kgAN-1; and this number is the goal for future research. Acetylene synthesis from CH4 provides an example that illustrates the enormous potential of nonequilibrium plasmas. For a process to synthesize C2H2 from CH4 that is governed by local equilibrium, such as a thermal plasma, the entire gas must be heated to a temperature where the thermodynamics are favorable, and then the reaction enthalpy must be supplied. Following reaction, the products must be quenched. The theoretical minimum energy required per mass of C2H2 for a thermal process has been estimated to be 7.9 kWh kgC2H2−1 (Table 3). The most energy-efficient thermal plasma processes for the synthesis of C2H2 from CH4 have reported SER values of 9.0 kWh kgC2H2−1, which is very close to the thermal limit. The literature on the use of nonequilibrium CH4 plasmas for C2H2 synthesis is sparse, but early work on microwave plasmas operating at pressures near 0.1 bar reported SER values as low as 6.2 kWh kgC2H2−1, less than the thermal limit. The ultimate thermodynamic limit for a nonequilibrium process operating at ambient temperature would be the reaction enthalpy of 4.0 kWh kgAN-1. This example of C2H2 synthesis from CH4 demonstrates that it is feasible for nonequilibrium plasmas to have lower specific energy requirements than the theoretical lower limit for thermal plasmas. Assuming that some improvement could be made with systematic optimization, and that the HCN SER under this optimized condition is similar to acetylene, a goal of 5.6 kWh kgAN-1 is set for nonequilibrium plasma-catalytic synthesis.

Using a specific energy input of 5.6 kWh kgAN-1, the assumption that all CAPEX and OPEX is twice the cost of electricity, plus the other inputs CH4 and N2, some simple economic estimates were made of the cost to produce one kilogram of acrylonitrile. The input parameter estimates were taken from market values late in the year 2022. There are several important conclusions to be drawn from the data in the below table. First, at a small scale before saturation of the market for AN, which is approximately 6 million tons year-1, 90% of the value produced by this plasma-catalytic process is in the AN. For each kg of AN that is produced, there is only 0.17 kg of H2 produced as a byproduct. In the below table, the current United States Department of Energy goal for 2030 of 1 \$ kgH2−1 is conservatively used as a value for H2. However, this value is not very important, since the value of AN is also in the range 1 to 3 \$ kgAN-1; and thus the value of AN is approximately the same as H2 per mass. The important point is that the plasma-catalytic process produces much less H2 by mass, only 0.17 kgH2 kgAN-1. Thus, approximately 90% of the value produced by the process is in the AN. The situation may change at larger scales greater than 10 million tons year-1. Second, from the below table, the plasma-catalytic process can be competitive with water electrolysis in the specific energy requirement of the H2 produced. More specifically, in this best case scenario, it is expected that the hydrogen will require 33 kWh kgH2−1 to produce; which is similar to water electrolysis at an industrial scale that requires 55 kWh kgH2−1 at 61% plant efficiency. Finally, the production cost of AN (\$1.35 kgAN-1), before sale or utilization of the H2, is already competitive with the cost of production for the SOHIO process (\$1.50 kgAN-1). Therefore, H2 represents a profitable byproduct, or it can be oxidized to provide electricity for this energy intensive plasma-catalytic process. Compared to water electrolysis, this plasma-catalytic process is expected to have a similar electricity intensity per mass of H2 produced at an industrial scale but be more profitable because AN is more valuable than O2. However, research is necessary to close the gap between the actual performance (FIG. 18C) and the technical goal (the below table). Once the specific energy requirement is less than 10 kWh kgAN-1, expenditure of the resources required to do a more rigorous and detailed technoeconomic analysis, including incorporation of actual product distributions, efficiencies of power transformers, cost of separation, sensitivity analysis and component breakdowns, etc. is justified.

| Input parameter | Value | Units |
|---|---|---|
| $CH_4$ consumed | 0.91 | $kg_{CH4}/kg_{AN}$ |
| $N_2$ consumed | 0.26 | $kg_{N2}/kg_{AN}$ |
| AN produced | 1 | $kg_{AN}/kg_{AN}$ |
| $H_2$ produced | 0.17 | $kg_{H2}/kg_{AN}$ |
| HCN consumed | 0.51 | $kg_{HCN}/kg_{AN}$ |
| $C_2H_2$ consumed | 0.49 | $kg_{C2H2}/kg_{AN}$ |
| Cost of natural gas ($CH_4$) | 0.47 | $/kg_{CH4}$ |
| Cost of $N_2$ | 0.54 | $/kg_{N2}$ |
| Cost of electricity | 0.07 | $/kWh |
| CAPEX and other OPEX | 0.07 | $/kWh |
| Value of $H_2$ | 1.0 | $/kg_{H2}$ |

-continued

| Input parameter | Value | Units |
|---|---|---|
| Nonequilibrium plasma-catalysis (best-case scenario) | | |
| Gross SER of AN | 5.6 | $kWh/kg_{AN}$ |
| Gross SER of $H_2$ | 33 | $kWh/kg_{H2}$ |
| Production cost | 1.35 | $\$/kg_{AN}$ |
| Production cost less $H_2$ value | 1.18 | $\$/kg_{AN}$ |

In addition to the plasma-catalytic process being economically competitive with the SOHIO process in the best-case scenario, it also is expected to have lower $CO_2$ emissions thereby decarbonizing the production of AN. Even if the plasma process is driven by low carbon electricity, the production of methane still can result in $CO_2$ emission because that is a common impurity in the primary resource. Methane is mixed with $CO_2$ in biogas and natural gas. For biogas, the $CO_2$ is photosynthetic in origin, so its release to the atmosphere has an insignificant effect on the global CO2 balance. However, for natural gas, the CO2 emission associated with its removal from the hydrocarbon mixture that comes from beneath the surface of the earth must be considered, which results in approximately 0.37 kgCO2e kgCH4−1. The removal of this CO2 also requires a small amount of energy, approximately 0.073 kWh kgCH4−1. Similarly, production of N2 by air separation requires a small amount of energy, approximately 0.069 kWh kgN2−1 If this electricity to separate CH4 and N2 from the natural resource is supplied by the grid (0.39 kgCO2e kWh-1), and the electricity required to power the plasma is supplied from a low carbon source, such as wind (0.01 kgCO2e kWh-1), then the CO2 emission of the proposed process (0.48 $kg_{CO2e}$ $kg_{AN}^{-1}$) is much lower than state-of-the-art ammoxidation (1.4 $kg_{CO2e}$ $kg_{AN}^{-1}$). The overall economic and CO2 emission comparisons between the SOHIO process and the best-case plasma-catalytic process are presented in the below table.

| Method (per $kg_{AN}$) | $CO_2e$ | Gross energy | Gross cost |
|---|---|---|---|
| Ammoxidation (state-of-the-art) | 1.4 $kg_{CO2e}$ | 6.1 kWh | $1.50 |
| Nonequilibrium plasma (best-case) | 0.48 $kg_{CO2e}$ | 5.6 kWh | $1.35 |

In this disclosure, a plasma-catalytic process to synthesize acrylonitrile (AN, $CH_2CHCN$) from methane ($CH_4$) and nitrogen ($N_2$) has been demonstrated. The process involves two steps that occur in direct fluid communication: 1) plasma synthesis of $C_2H_2$+HCN intermediates from methane and nitrogen; and then 2) downstream thermocatalytic synthesis of AN from the acetylene and hydrogen cyanide intermediates. From the plasma step, yield of $C_2H_2$+HCN greater than 90% was measured. The yield of $C_2H_2$+HCN increases with increasing throughput at constant specific energy input. Assuming perfect downstream catalytic conversion of $C_2H_2$ and HCN into AN, an ideal specific energy requirement of AN of 73.1 kWh kgAN-1 has been measured. Actual thermocatalytic experiments performed by passing the plasma effluent through a packed bed of ZnO-based catalyst at 773 K revealed large amounts of acrylonitrile. When the plasma effluent was rich in C2H2 relative to HCN, the major impurity produced by the thermocatalytic reactor was benzene; and when it was nominally stoichiometric C2H2+HCN, the major impurities were propanenitrile and butanedinitrile. A best-case economic and lifecycle estimate was performed to set technical goals for further development of this plasma-catalytic process. At a specific energy requirement for AN of 5.6 kWh kgAN-1, the cost of production for AN is competitive with the industrial state-state-of-the-art SOHIO ammoxidation process. When driven by low CO2e electricity, such as wind or nuclear power, the plasma-catalytic process produces dramatically less CO2e kgAN-1 compared to SOHIO ammoxidation. The hydrogen produced by the plasma-catalytic process can either be sold at a profit or oxidized to produce electricity to be fed back into the plant during lulls in electricity supply.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a plasma reactor, comprising:

providing the plasma reactor, the plasma reactor comprising:

at least one dielectric tube defining at least one lumen;

at least one electrode positioned adjacent to the dielectric tube, the at least one electrode configured to produce a high voltage and high energy signal alternating at a frequency ranging from about 0.1 MHz to about 10,000 MHZ, wherein the high voltage and high energy signal is delivered to at least one plasma region within at least one lumen of the at least one dielectric tube;

a hydrogen gas source operatively coupled to the at least one dielectric tube, the hydrogen gas source configured to introduce gaseous hydrogen at a predetermined constant rate to the at least one plasma region; and a carbon gas source operatively coupled to the at least one dielectric tube, the carbon gas source configured to introduce a carbon-containing gas to the at least one plasma region at a controllable flow rate ranging between essentially zero rate and a predetermined setpoint rate; and introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.

2. The method of claim 1, wherein the carbon-containing gas comprises a hydrocarbon.

3. The method of claim 1, wherein the carbon-containing gas comprises $CH_4$.

4. A plasma reactor, comprising:

at least one dielectric tube defining at least one lumen;

at least one electrode positioned adjacent to the at least one dielectric tube, the at least one electrode configured to produce a high voltage and high energy signal alternating at a frequency ranging from about 0.1 MHz to about 10,000 MHZ, wherein the high voltage and high energy signal is delivered to at least one plasma region within at least one lumen of the at least one dielectric tube;

a hydrogen gas source operatively coupled to the at least one dielectric tube, the hydrogen gas source configured to introduce gaseous hydrogen at a predetermined constant rate to the at least one plasma region; and a carbon gas source operatively coupled to the at least one dielectric tube, the carbon gas source configured to introduce a carbon-containing gas to the at least one plasma region in an alternating pattern of essentially zero flow rate for a plasma region cleaning interval and at a predetermined setpoint rate for a product synthesis interval, wherein a molar ratio of $H_2$:C of a gas mixture within the at least one plasma region is less than about 10:1 during the product synthesis interval.

5. The reactor of claim 4, wherein the at least one dielectric tube and the at least one electrode comprise one dielectric tube passing through an electrode ring pair comprising a first electrode ring that is electrically grounded and a second electrode ring configured to produce the high voltage and high energy signal, wherein the electrode rings are coaxially aligned.

6. The reactor of claim 5, further comprising at least one additional electrode ring pair coaxially aligned with the electrode ring pair.

7. The reactor of claim 4, wherein the at least one dielectric tube and at least one electrode comprise a plurality of dielectric tubes passing through coaxially-aligned openings formed in a pair of perforated plate electrodes comprising a first perforated plate electrode that is electrically grounded and a second perforated plate electrode configured to produce the high voltage and high energy signal.

8. The reactor of claim 5, further comprising at least one additional pair of perforated plate electrodes coaxially aligned with the pair of perforated plate electrodes.

9. A method of producing hydrogen ($H_2$) and a product compound by nonequilibrium plasma synthesis, the method comprising:

introducing methane ($CH_4$) and nitrogen ($N_2$) into a nonequilibrium plasma reactor at a $CH_4$:$N_2$ molar ratio of about 3:0.75 to produce a mixture of acetylene ($C_2H_2$), hydrogen cyanide (HCN) and hydrogen ($H_2$) at a $C_2H_2$:HCN:$H_2$ molar ratio of about 1:1:4.5;

introducing the mixture of acetylene ($C_2H_2$), hydrogen cyanide (HCN), and hydrogen ($H_2$) into a thermocatalytic reactor configured to cause the mixture to react in the presence of a catalyst to produce a second mixture comprising hydrogen ($H_2$) and the product compound;

introducing the second mixture into a separation device to separate the hydrogen ($H_2$) from the product compound; and introducing the gaseous hydrogen to the at least one plasma region at the predetermined constant rate and introducing the carbon-containing gas to the at least one plasma region in an alternating pattern of essentially zero flow rate for a plasma region cleaning interval and the predetermined setpoint rate for a product synthesis interval, wherein a molar ratio of $H_2$:C of a gas mixture within the at least one plasma region is less than about 10:1 during the product synthesis interval.

10. The method of claim 9, wherein the nonequilibrium plasma reactor comprises at least one dielectric tube defining at least one lumen and at least one electrode positioned adjacent to the dielectric tube, the at least one electrode configured to produce a high voltage and high energy signal alternating at a frequency ranging from about 0.1 MHz to about 10,000 MHZ, wherein the high voltage and high energy signal is delivered to at least one plasma region within at least one lumen of the at least one dielectric tube.

11. The method of claim 9, wherein the nonequilibrium plasma reactor operates at a reaction pressure ranging from about 20 Torr to about 100 Torr.

12. The method of claim 9, wherein the catalyst comprises a catalyst selected from the group consisting of Ni-based catalysts, Cd-based catalysts, Mg-based catalysts, Ca-based catalysts, and combinations thereof, wherein the catalyst is optionally supported by a supporter selected from the group consisting of $Al_2O_3$, $Al_2MgO_4$, and combinations thereof.

13. The method of claim 9, wherein the catalyst comprises a catalyst selected from the group consisting of Ni-based catalyst.

14. The method of claim 9, wherein the Ni-based catalyst comprises a supported nickel catalyst comprising Ni/$Al_2O_3$.

* * * * *